(12) United States Patent
Haruta et al.

(10) Patent No.: US 8,570,554 B2
(45) Date of Patent: Oct. 29, 2013

(54) IMAGE PROCESSING SYSTEM INCLUDING IMAGE FORMAT PRIORITIZING AND CONTROL METHOD THEREOF

(75) Inventors: Kenichirou Haruta, Kawasaki (JP); Naoto Yamada, Kawasaki (JP)

(73) Assignee: Canon Kabushiki Kaisha (JP)

( * ) Notice: Subject to any disclaimer, the term of this patent is extended or adjusted under 35 U.S.C. 154(b) by 778 days.

(21) Appl. No.: 12/203,912

(22) Filed: Sep. 4, 2008

(65) Prior Publication Data

US 2009/0067003 A1   Mar. 12, 2009

(30) Foreign Application Priority Data

Sep. 7, 2007   (JP) .................................. 2007-233375

(51) Int. Cl.
*G06F 3/12* (2006.01)
*G06F 15/00* (2006.01)
*G06K 1/00* (2006.01)

(52) U.S. Cl.
USPC .......................................... 358/1.15; 358/1.9

(58) Field of Classification Search
None
See application file for complete search history.

(56) References Cited

U.S. PATENT DOCUMENTS

| | | | |
|---|---|---|---|
| 6,348,971 B2 * | 2/2002 | Owa et al. ..................... | 358/1.15 |
| 6,874,082 B2 * | 3/2005 | Tateyama et al. .................. | 713/1 |
| 2002/0122070 A1 * | 9/2002 | Watanabe ..................... | 345/810 |
| 2002/0135796 A1 * | 9/2002 | Alexander ..................... | 358/1.15 |
| 2003/0002077 A1 * | 1/2003 | Shima ........................... | 358/1.15 |
| 2003/0053135 A1 * | 3/2003 | Simpson et al. ................ | 358/2.1 |
| 2003/0208644 A1 * | 11/2003 | Shimizu et al. ................. | 710/15 |
| 2003/0231328 A1 * | 12/2003 | Chapin et al. ................ | 358/1.13 |
| 2005/0094178 A1 * | 5/2005 | Anno ........................... | 358/1.13 |
| 2006/0224939 A1 | 10/2006 | Namikata | |
| 2008/0112013 A1 * | 5/2008 | Ferlitsch et al. ............. | 358/3.28 |
| 2008/0168034 A1 * | 7/2008 | Tsuchiya ......................... | 707/3 |

FOREIGN PATENT DOCUMENTS

| | | |
|---|---|---|
| JP | 2002271559 A | 9/2002 |
| JP | 2005303558 A | 10/2005 |
| JP | 2006-287745 A | 10/2006 |

OTHER PUBLICATIONS

Office Action issued Aug. 23, 2013 for corres. JP 2012-070152.

* cited by examiner

*Primary Examiner* — Ming Hon
(74) *Attorney, Agent, or Firm* — Rossi, Kimms & McDowell LLP

(57) ABSTRACT

An image processing system and a control method thereof are provided, which presents an appropriate image format for the image data to be stored. To accomplish this, in an image processing system comprising a plurality of image forming apparatuses and storage apparatuses, the image forming apparatuses each decide priority scores indicating priority order of each image format from the image processing information that indicates image formats of image data supported at each image forming apparatus. Further, the image forming apparatuses show the priority order based on the decided priority scores, and at the same time generates a selection screen for the user to select the image format of the image data and display it on the display apparatus provided in the image forming apparatus.

10 Claims, 19 Drawing Sheets

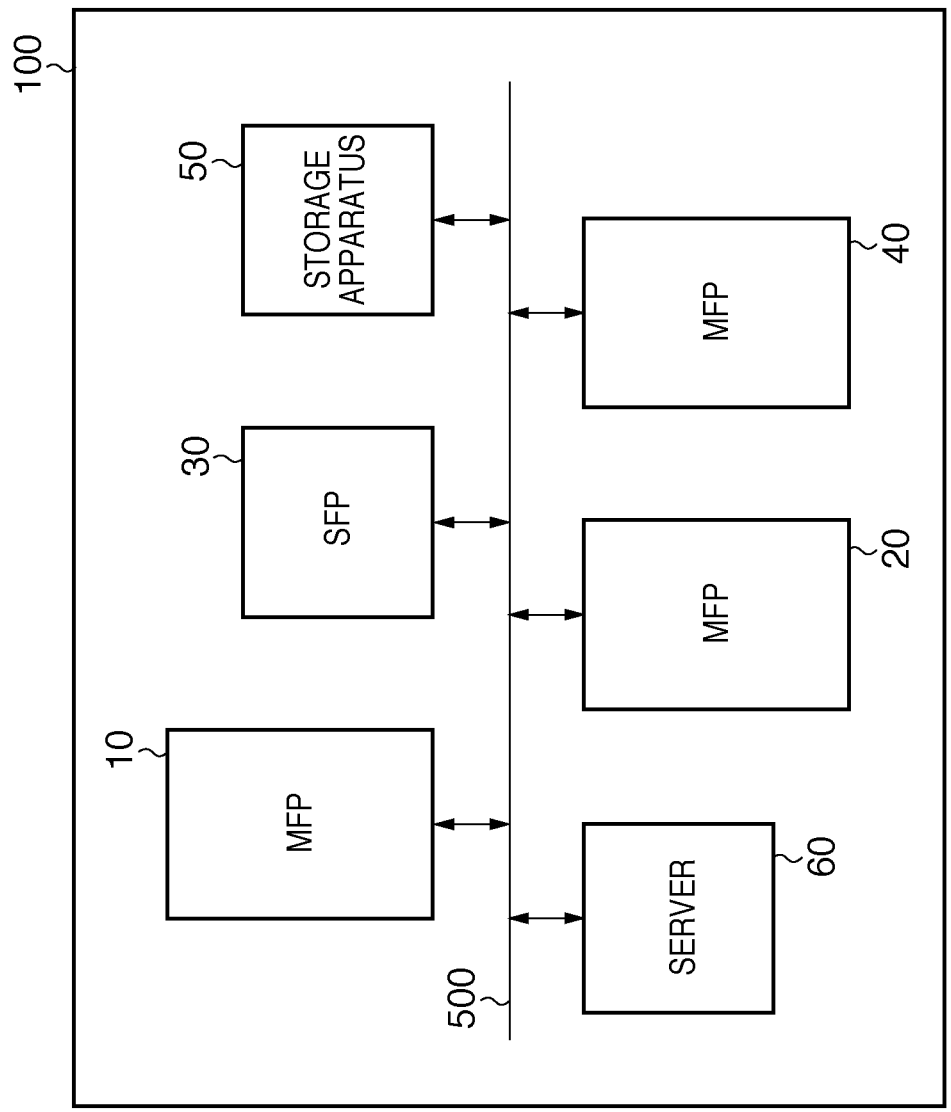

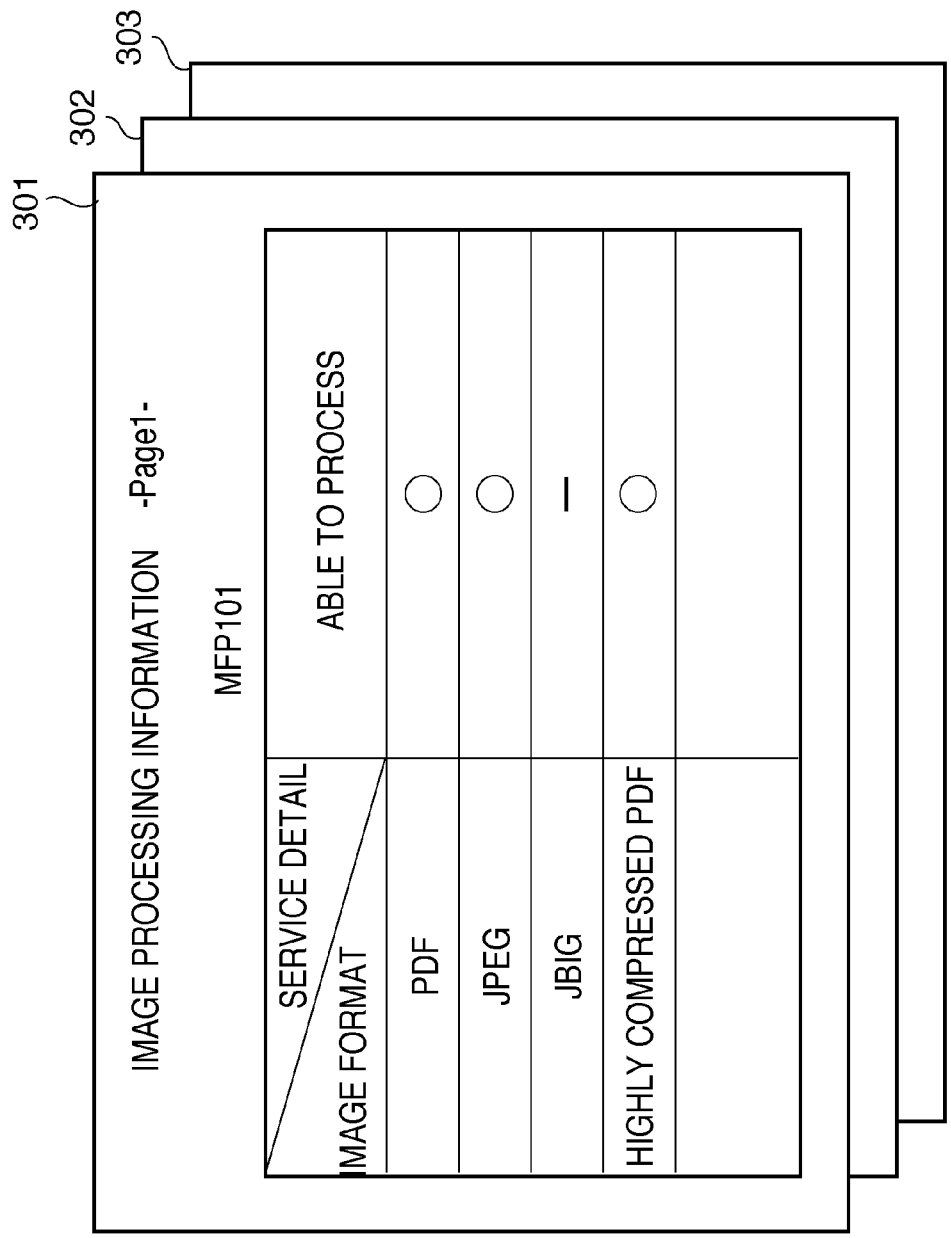

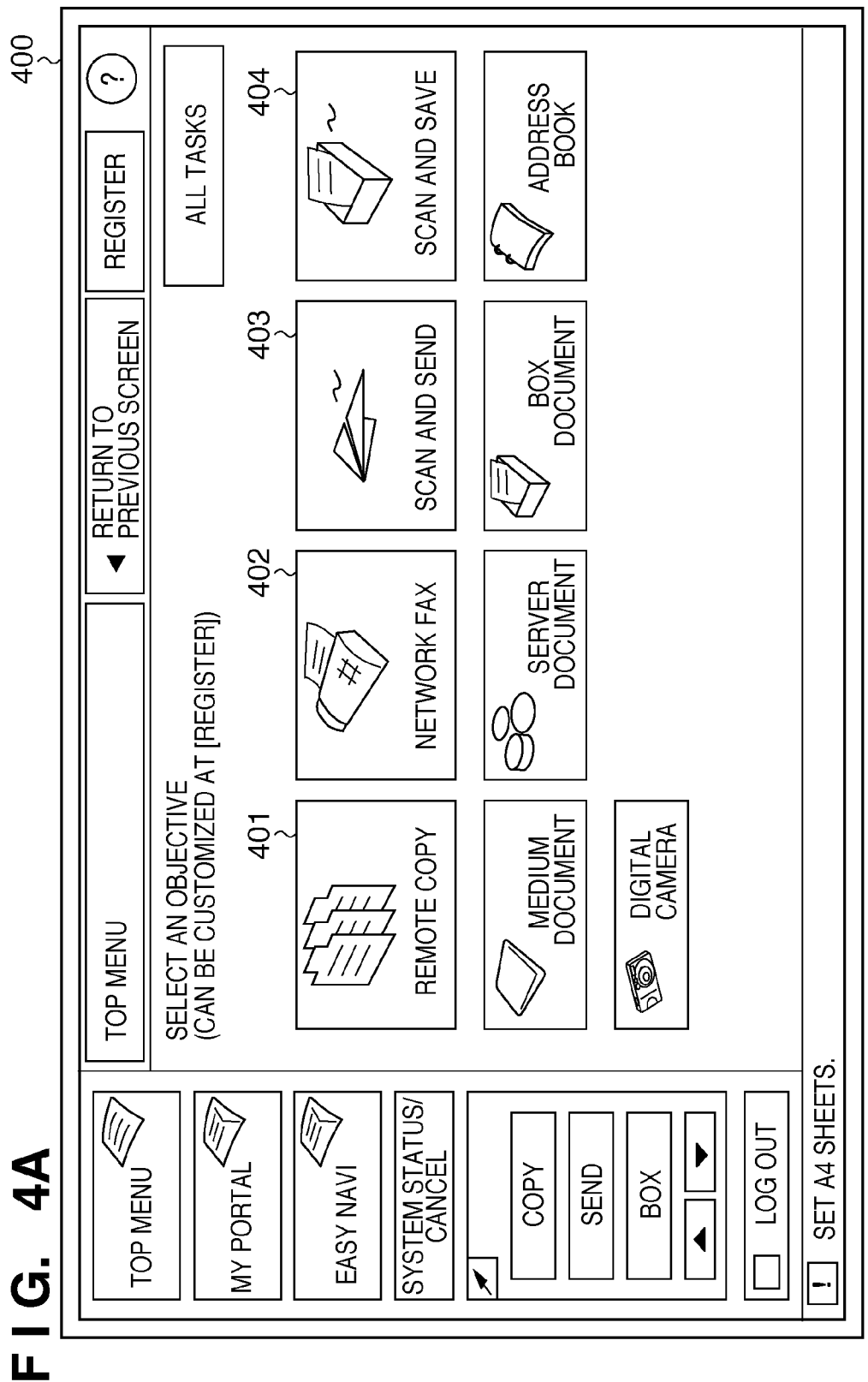

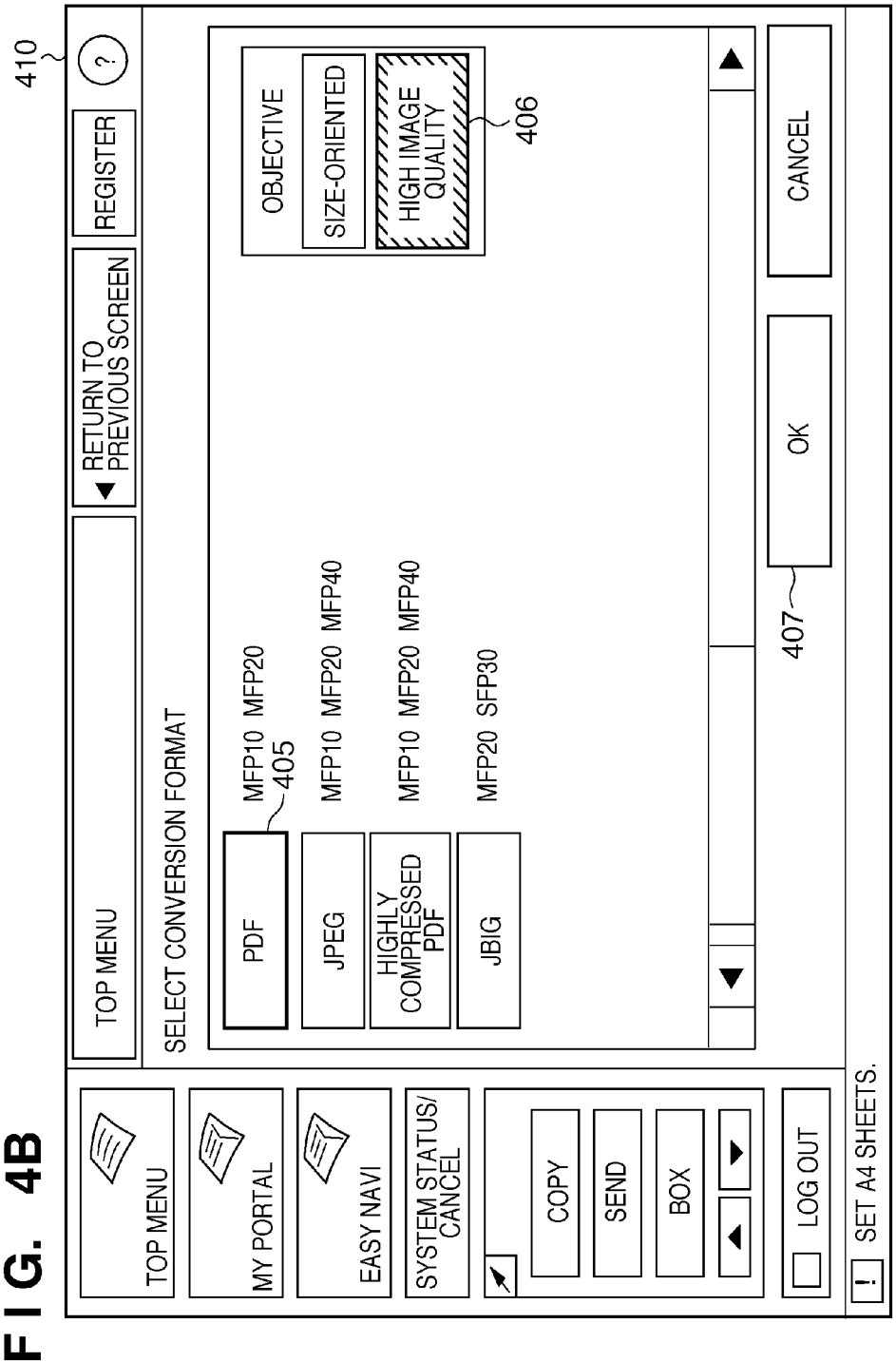

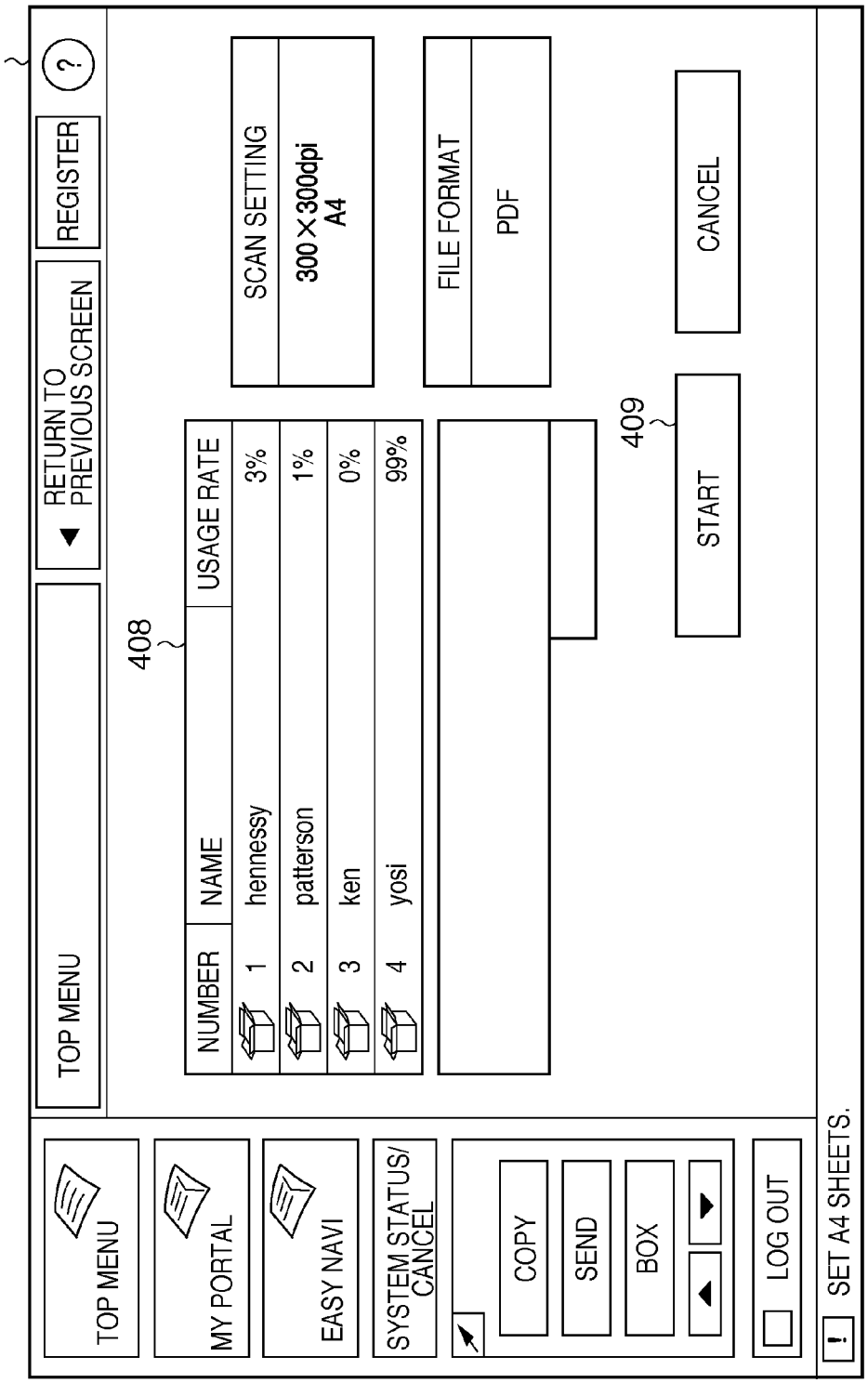

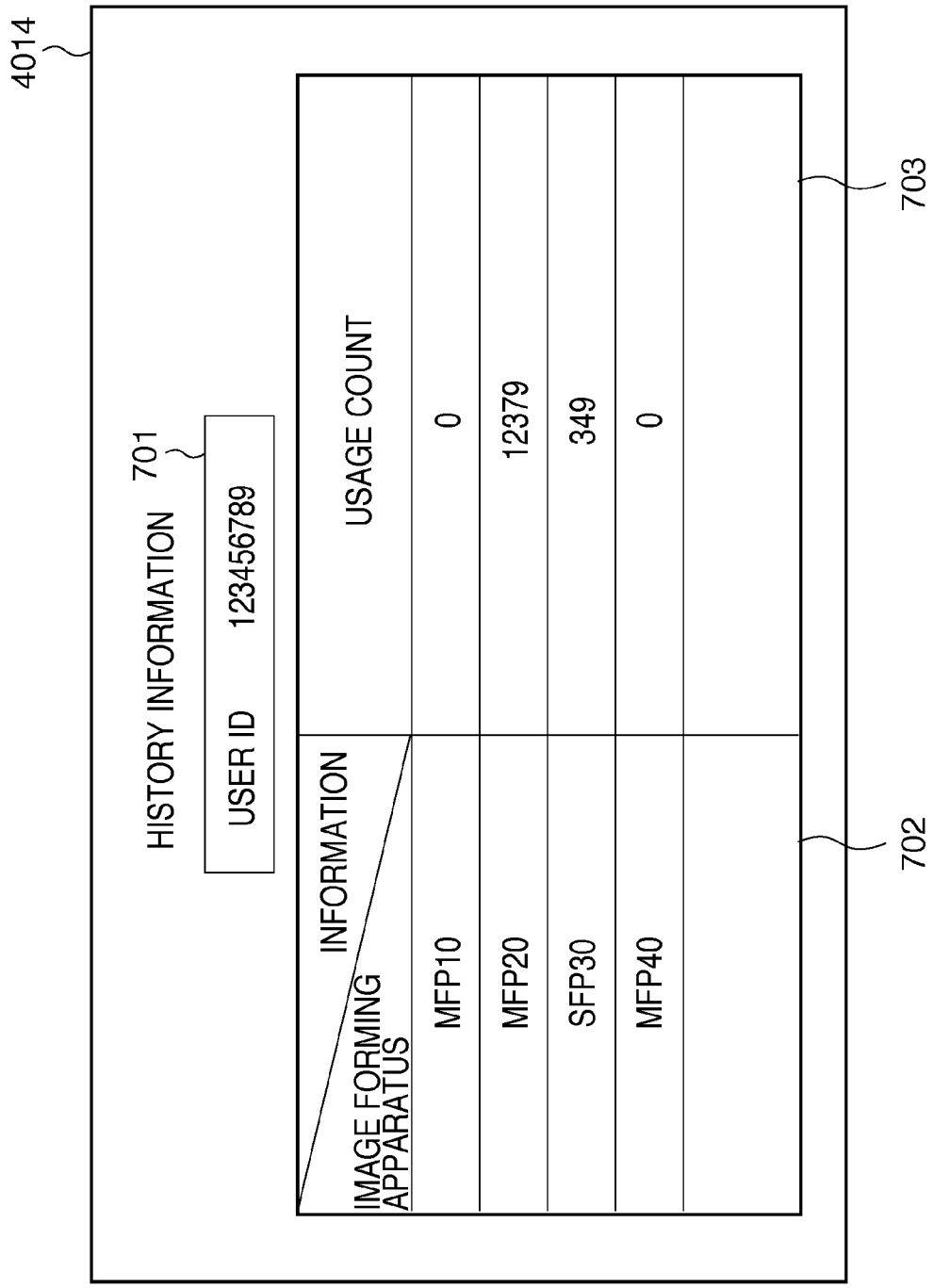

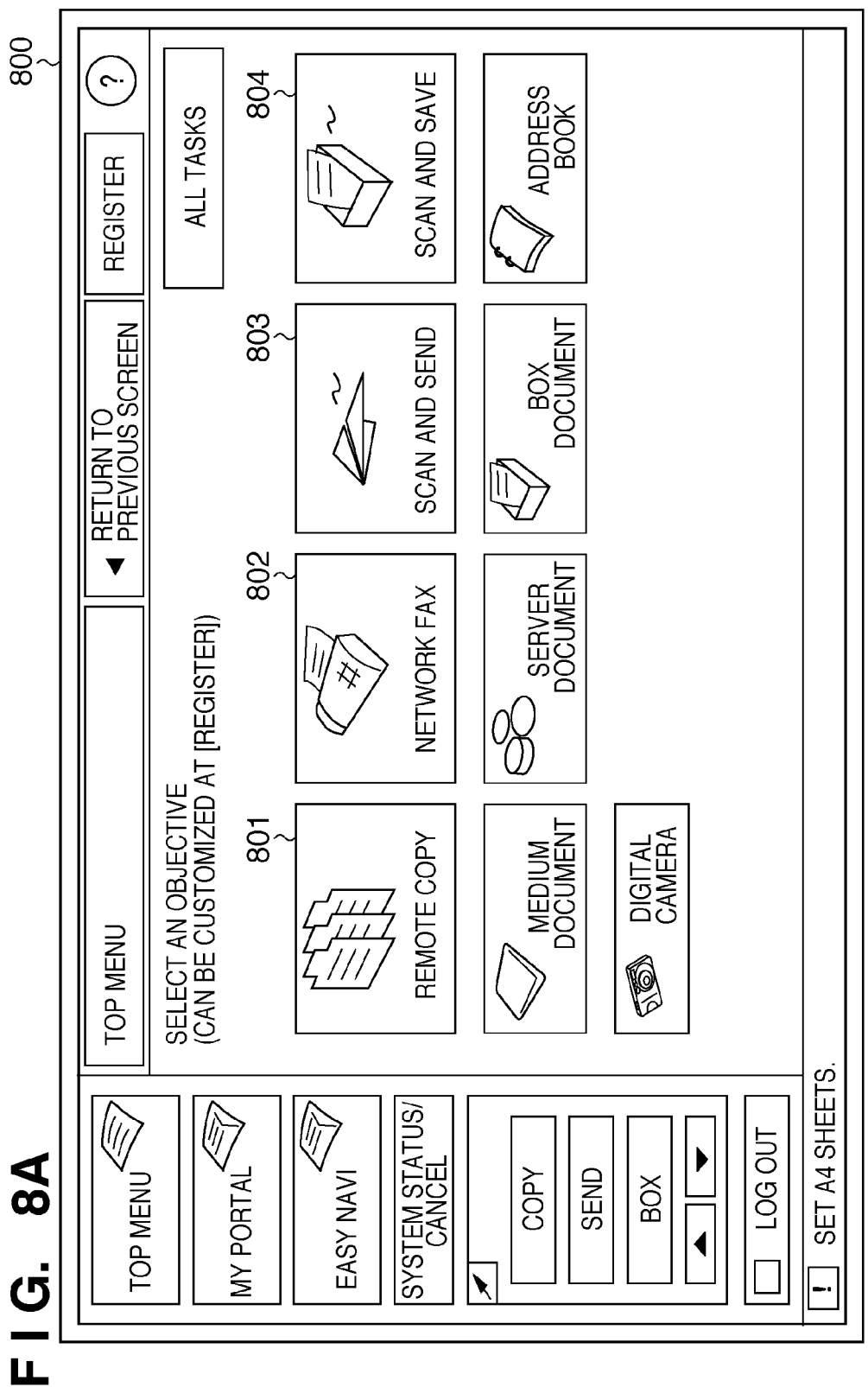

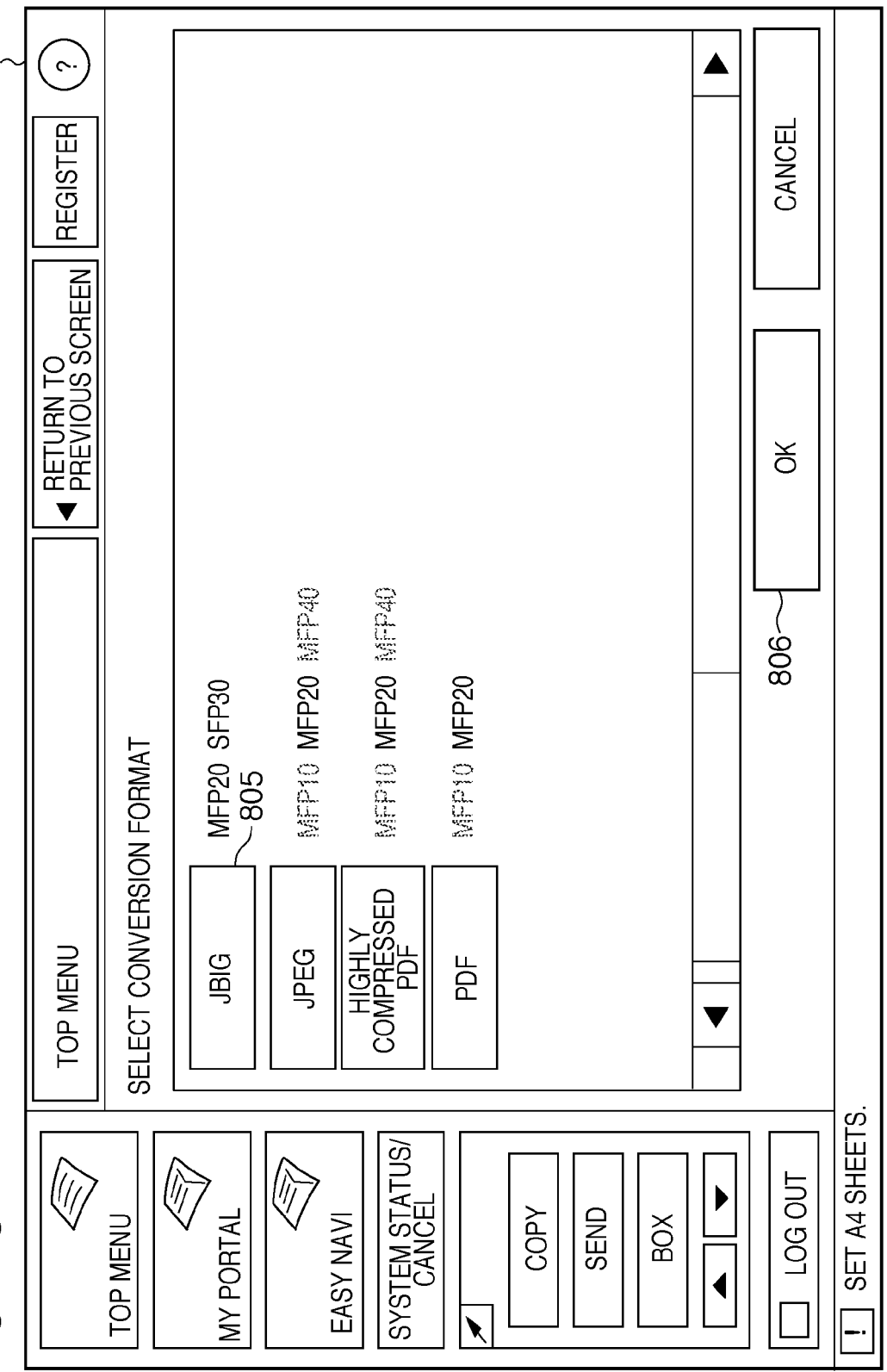

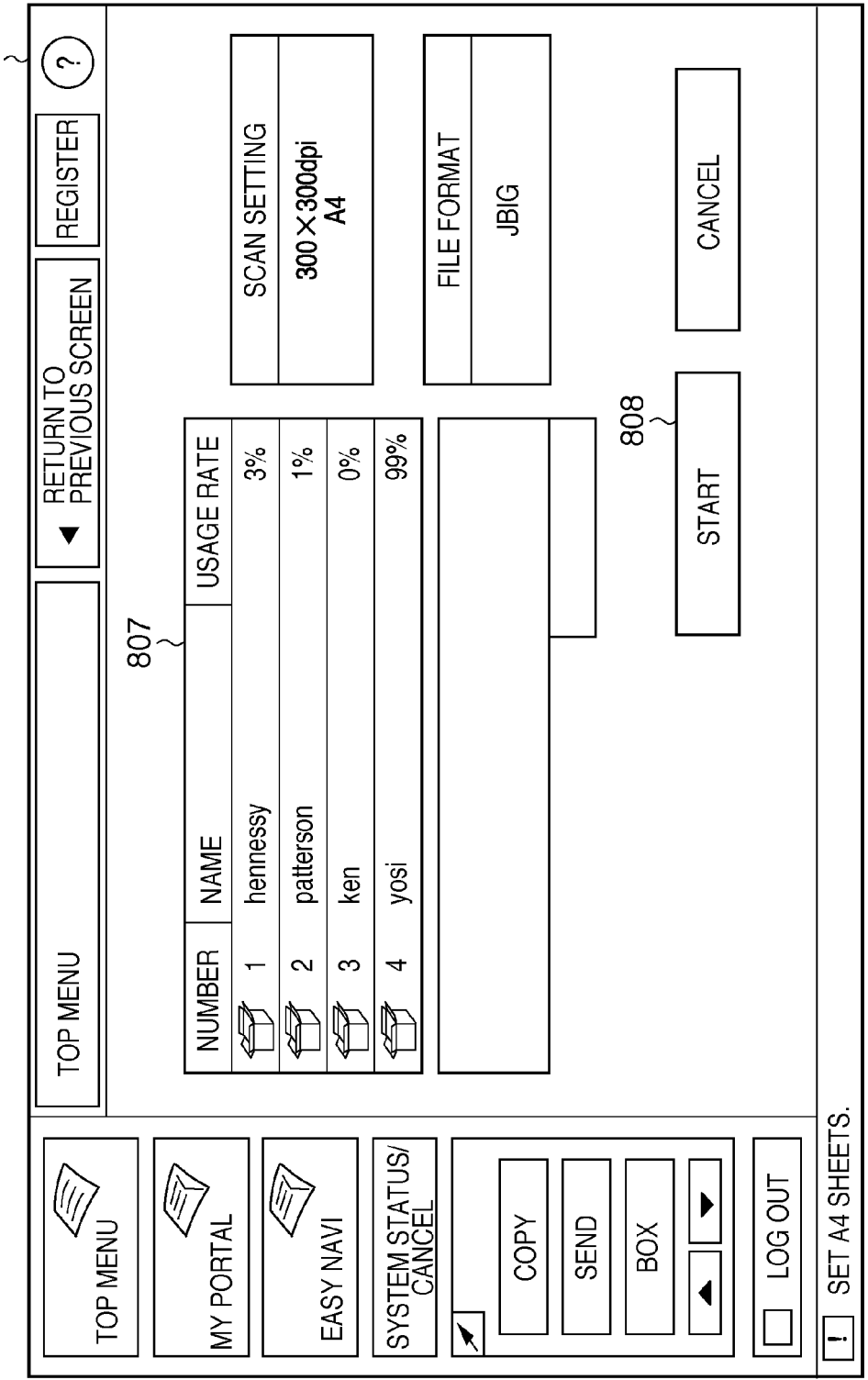

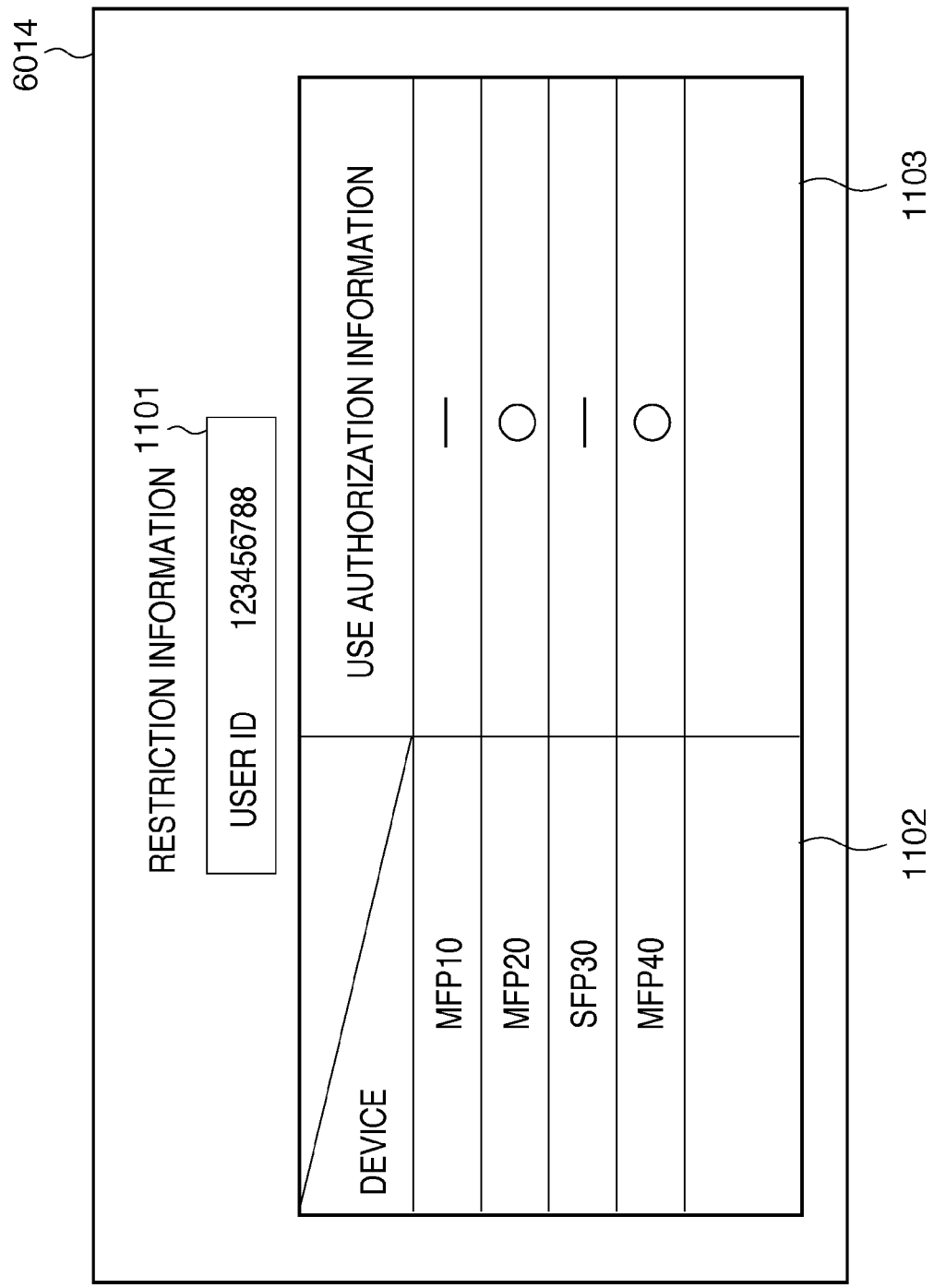

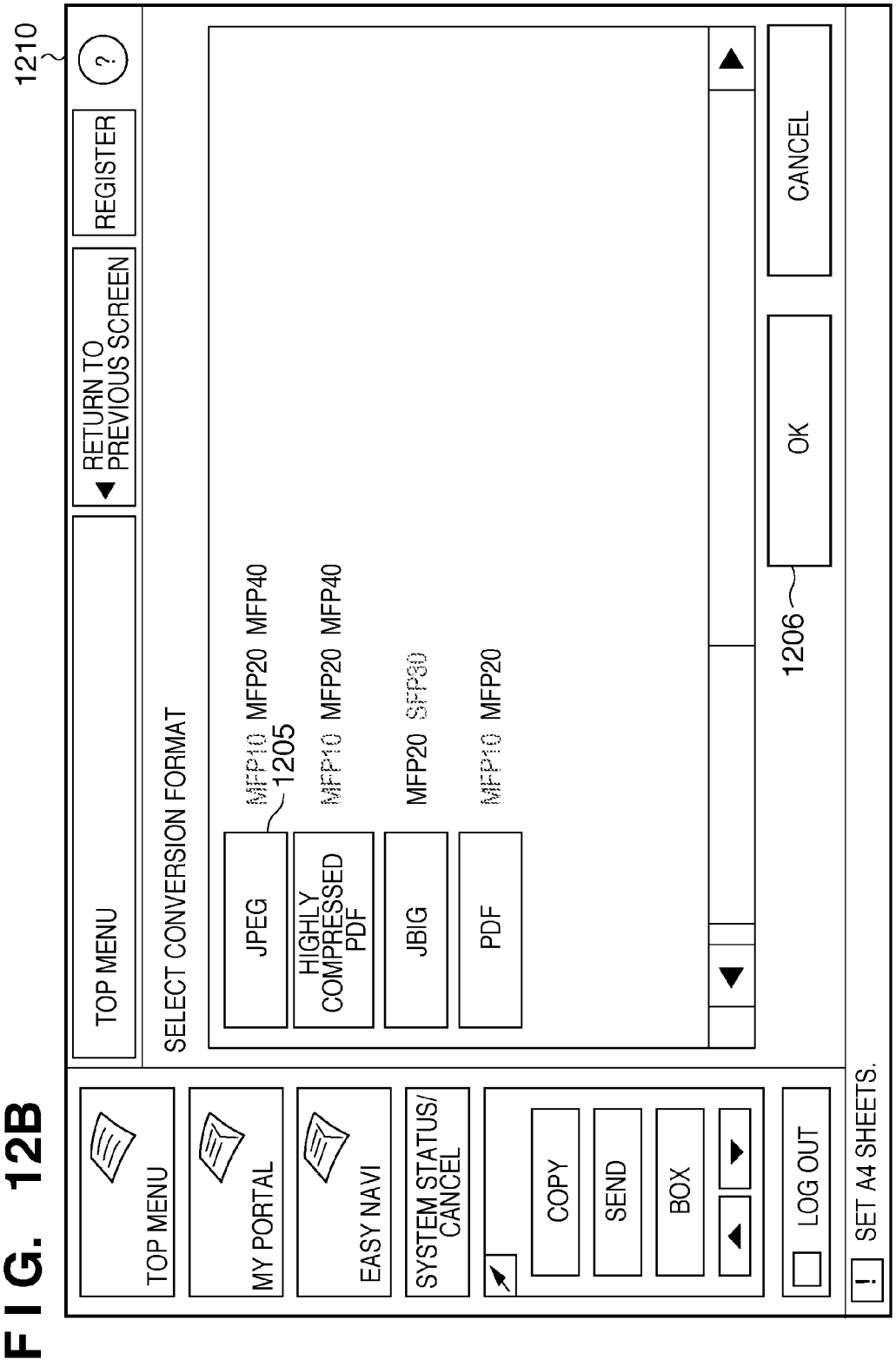

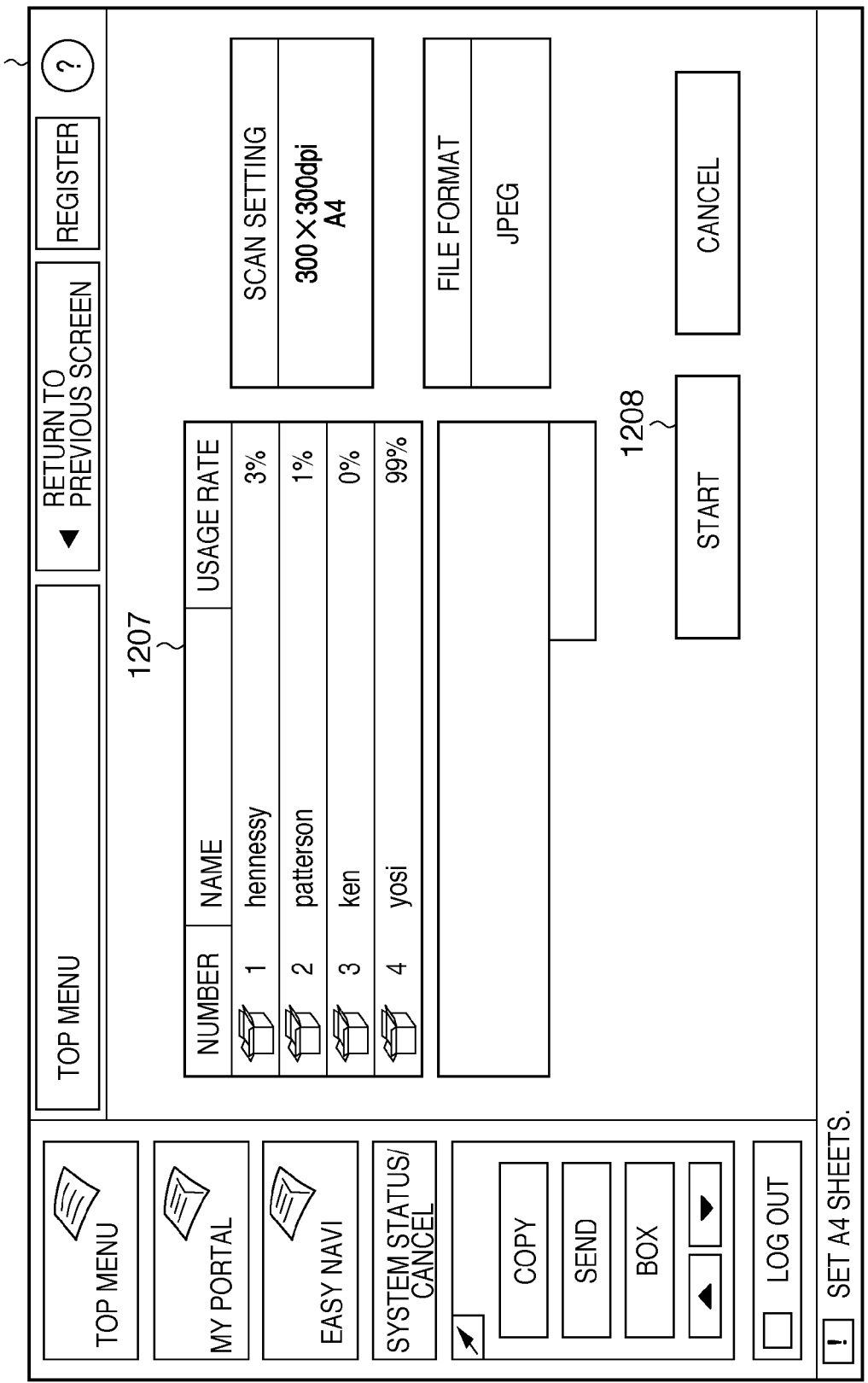

IMAGE PROCESSING SYSTEM INCLUDING IMAGE FORMAT PRIORITIZING AND CONTROL METHOD THEREOF

BACKGROUND OF THE INVENTION

1. Field of the Invention

The present invention relates to an image processing system comprising a plurality of image forming apparatuses and storage apparatuses connected to a network and the control method thereof.

2. Description of the Related Art

Presently, image processing systems which share image data between a plurality of image forming apparatuses connected to a network are known. Specifically, image data is shared by storing it in storage apparatuses connected to a network, which enables to save and output the image data.

Japanese Patent Publication No. 2006-287745 discloses a document management system which manages device profile information for each of a plurality of image forming apparatuses, converts image data to a common image format based on the individual device profile and saving the converted image data in a storage apparatus.

However, there are problems in this conventional technique as listed below. For example, without knowing from which image forming apparatus the image data is outputted, it is difficult for the user to decide in which format the image should be converted to when saving the image data. Especially, when saving the image data in a storage apparatus which can be accessed by various types of image forming devices, the choice of image format is critical since the format supported by each device differs.

Further, when highly compressed high resolution image data is to be saved, the user has to check for image formats supported by the image forming devices within the network prior to selecting an image format, requiring troublesome operation. Further, there have been cases where the user could not select a desired image format due to the processing capabilities of the image forming device.

SUMMARY OF THE INVENTION

The present invention enables realization of an image processing system which presents an appropriate image format for image data to be stored and the control method thereof.

One aspect of the present invention provides an image processing system connected with a plurality of image forming apparatuses and storage apparatuses storing image data via a network, wherein each of the plurality of image forming apparatuses comprises: a first storage unit adapted to store image processing information that indicates image format of image data which is supported by the image forming apparatus, a first acquiring unit adapted to acquire image processing information of each of the image forming devices via the network when storing image data in the storage apparatus, a deciding unit adapted to decide priority which indicates priority order of image formats based on the acquired image processing information, a display control unit adapted to generate a selection screen indicating the priority order of image formats based on the decided priority and enabling the user to select an image format, and display the selection screen on the display apparatus of the image forming apparatus, an acceptance unit adapted to accept image format selection via the selection screen, an input unit adapted to input image data, a conversion unit adapted to convert the input image data into the selected image format, and a transmission unit adapted to transmit the converted image data via the network to the storage apparatus in order to store the converted image data in the storage apparatus.

Another aspect of the present invention provides a control method for an image processing system connected with a plurality of image forming apparatuses and storage apparatuses storing image data via a network, comprising steps of: storing image processing information that indicates image format of image data which is supported by the image forming apparatus, acquiring image processing information of each of the image forming devices via the network when storing image data in the storage apparatus, deciding priority which indicates priority order of image formats based on the acquired image processing information, generating a selection screen indicating the priority order of image formats based on the decided priority and enabling the user to select an image format, and displaying the selection screen on the display apparatus of the image forming apparatus, accepting image format selection via the selection screen, inputting image data, converting the input image data into the selected image format, and transmitting the converted image data via the network to the storage apparatus in order to store the converted image data in the storage apparatus.

Further features of the present invention will be apparent from the following description of exemplary embodiments with reference to the attached drawings.

BRIEF DESCRIPTION OF THE DRAWINGS

FIG. 1 is diagram showing an exemplary arrangement of an image processing system 100 according to a first embodiment.

FIG. 3 is a diagram explaining image processing information 1006 according to the first embodiment.

FIG. 4A is a diagram showing an operation mode input screen 400 displayed on an operation unit 1009 according to the first embodiment.

FIG. 4B is a diagram showing a selection screen 410 for selecting an image format displayed on the operation unit 1009 according to the first embodiment.

FIG. 4C is a diagram showing a start screen 420 for starting service displayed on the operation unit 1009 according to the first embodiment.

FIG. 7 is a diagram explaining history information 4014 according to the second embodiment.

FIG. 8A is a diagram showing an operation mode input screen 800 displayed on an operation unit 4009 according to the second embodiment.

FIG. 8B is a diagram showing a selection screen 810 for selecting image format displayed on the operating unit 4009 according to the second embodiment.

FIG. 8C is a diagram showing a start screen 820 for starting service displayed on the operation unit 4009 according to the second embodiment.

FIG. 11 is a diagram explaining restriction information 6014 according to the third embodiment.

FIG. 12B is a diagram showing a selection screen 1210 for selecting screen format displayed on the operating unit 6009 according to the third embodiment.

FIG. 12C is a diagram showing a start screen 1220 for starting service displayed on the operation unit 6009 according to the third embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Below, with reference to FIG. 1 to 5, a first embodiment will be explained. FIG. 1 is diagram showing an exemplary arrangement of an image processing system 100 according to the first embodiment.

An Image processing system 100 comprises a plurality of image forming apparatuses. In particular, the image processing system 100 comprises multi function printers (MFP hereinafter) 10, 20 and 40, a single function printer (SFP hereinafter) 30, a server 60 and a storage apparatus 50. Each apparatus is connected to a network 500 and can transmit data to each other. The MFPs 10, 20, 40, and the SFP 30 indicate examples of image forming apparatuses which form images on a printing material. The server 60 requests image formation to each of the image forming apparatuses via the network 500. In particular, the server 60 transmits image data for the image to be formed on a printing material to at least one of the image forming apparatuses via the network 500. The storage apparatus 50 stores, for example, image data processed by the MFPs 10, 20, 40 and the SFP 30. According to this, the image processing system 100 can share image data between the devices connected to the network 500. Further, it is also possible to store image data transmitted from the server 60.

Figure 2A:
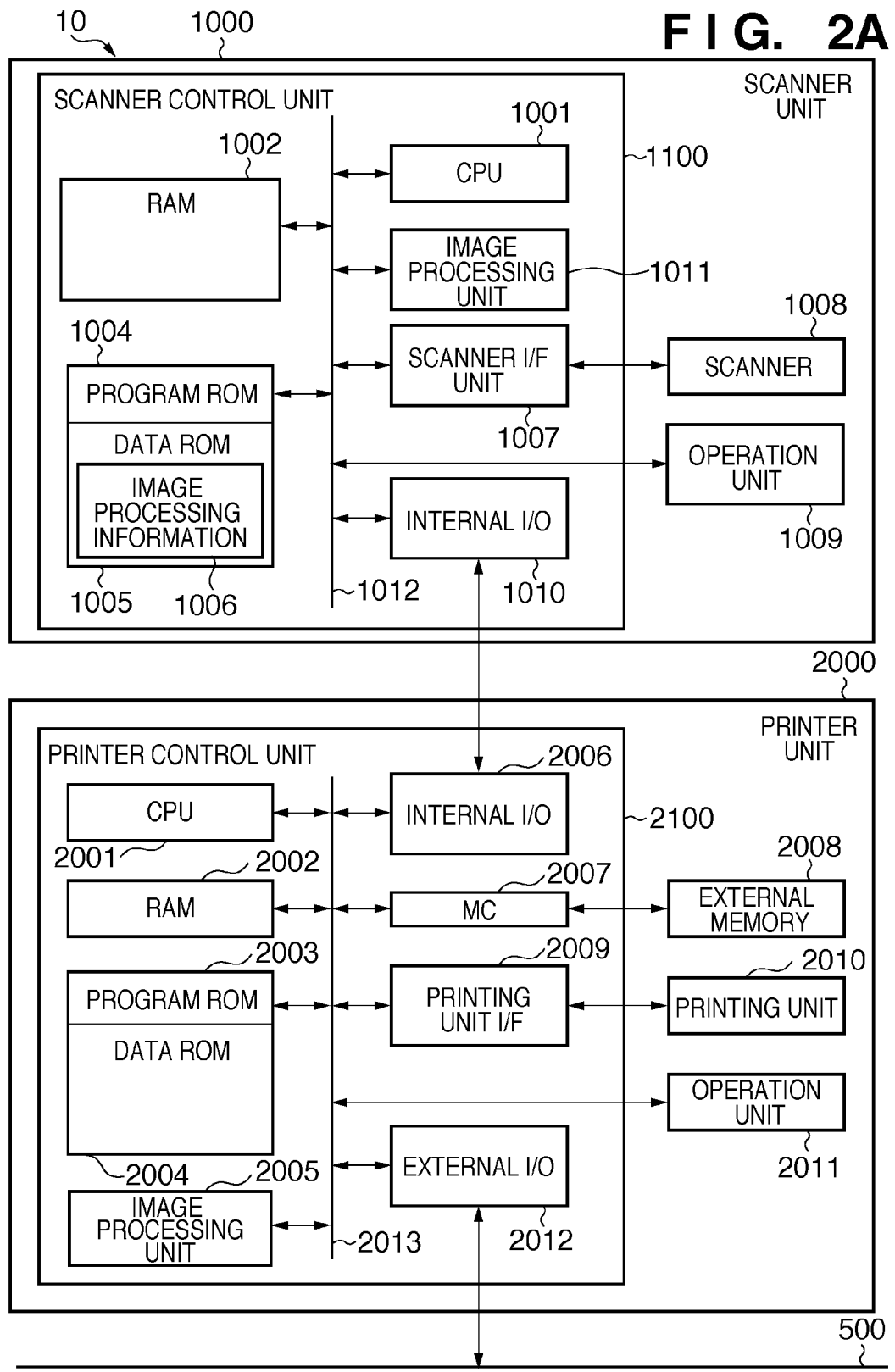
FIG. 2A is a diagram showing the structure of an MFP 10 according to the first embodiment.

Next, with reference to FIGS. 2A and 2B, the structures of MFPs 10, 20, 40, and SFP30 will be explained. FIG. 2A is a diagram showing the structure of an MFP 10 according to the first embodiment. Note that the structures of MFPs 20 and 40 are identical to that of MFP 10, and the explanation thereof will be omitted.

The MFP 10 comprises a scanner unit 1000 and a printer unit 2000. In further detail, the scanner unit 1000 comprises a scanner 1008, an operating unit 1009 and a scanner control unit 1100. The scanner 1008 extracts image data from originals by scanning them. The operating unit (panel) 1009 comprises an input device for user operation and a display device for notifying information to the user. The input device is comprised of, for example, a touch pad or various types of switches. Further, the display device comprised of, for example, an LED display.

The scanner control unit 1100 controls overall operation of the scanner 1008. The scanner control unit 1100 inputs image data scanned and outputted by the scanner 1008 as a video signal, and performs image processing such as conversion of the image data to a selected image format. Further, the scanner control unit 1100 transmits the converted image data to a printer unit 2000 (to be discussed later) or the network 500. Furthermore, the overall control of the operating unit 1009 is performed by the scanner control unit 1100, carrying out tasks such as notifying information to the user or receiving inputs from the user.

The scanner control unit 1100 comprises a CPU 1001, a RAM 1002, a program ROM 1004, a data ROM 1005, an internal I/O 1010, a scanner unit interface (I/F) 1007, and an image processing unit 1011. These components are connected by a system BUS 1012.

The CPU 1001 operates according to a control program stored in the program ROM 1004 which performs processing, or according to a control program stored in the RAM 1002. Further, the CPU 1001 controls the overall access of each of the devices connected to the system BUS 1012. Further, according to the present invention, the CPU 1001 can function as an acquiring unit, a deciding unit, a display control unit, an acceptance unit and a transmitting unit. The detailed processes which take place when the CPU 1001 functions as each of these units will be provided in a later section with reference to FIG. 5.

The scanner unit IF 1007 reads the image data scanned by the scanner 1008 to the scanner control unit 1100. The image processing unit 1011 performs, for the image read by the image data via the scanner unit I/F 1007, at least one of: data compression, resolution change, magnification change, clipping and multilevel/two-level modulation. The image processing unit 1011 functions as a converting unit, which converts the scanned image data to a certain image format. The image data which has been image-processed by the image processing unit 1011 is transmitted to the printer 2000 via the internal I/O 1010.

The data ROM 1005 stores image processing information 1006 which shows the format of image data supported by the MFP 10. In particular, the image processing information includes information such as PDF, TIFF, JBIG, etc, that indicate the image format of image data which can be formed by the MFP 10.

The printer 2000 receives and stores print information (including image data), etc., supplied from an external device connected to the network 500 or the scanner unit 1000 connected to the internal I/O 2006. Further, the printer unit 2000 creates a character (text) pattern, etc., corresponding to the received print information, and forms images on the printing material. For this, the printer 2000 comprises an external memory 2008, a printing unit 2010, an operating unit (panel) 2011 and a printer control unit 2100. The operating unit 2011 has various switches and an LED display, etc., for operation. Further, the above-mentioned operating unit 1009 and the operating unit 2011 can be installed as a single operating unit, and can also be separate operating units.

The printer control unit 2100 controls the overall operation of the printer unit 2000. In particular, the printer control unit 2100 analyzes image data, character data, etc., supplied from an external apparatus connected to the network 500 or the scanner unit 1000, and performs print request to the printing unit 2010. For example, the printer control unit 2100 converts the character pattern corresponding to the character information to a video signal, and transmits to the printing unit 2010.

The printer control unit 2100 comprises a CPU 2001, a RAM 2002, a program ROM 2003, a data ROM 2004, an image processing unit 2005, and a memory controller (MC hereinafter) 2007. Further, the printer control unit 2100 comprises a printing unit interface (I/F) 2009, an internal I/O 2006, and an external I/O 2012 for input/output of the network 500. These components are connected by a system BUS 2013.

The CPU 2001 operates according to a control program stored in a ROM 2003 which performs processes to be discussed later, or a control program stored in an external memory 2008. Further, the CPU 2001 controls the overall access to each device connected to the system bus 2013.

The image processing unit 2005 performs image processing such as color space conversion and halftone processing on the image data transmitted from the scanner unit 1000, and transmits an image signal, which is image processing output information, to the printing unit 2010 via the printing unit I/F 2009.

The RAM 2002 functions as the main memory, work area, etc., of the CPU 2001. The MC 2007 controls access to the external memory 2008.

Figure 2B:
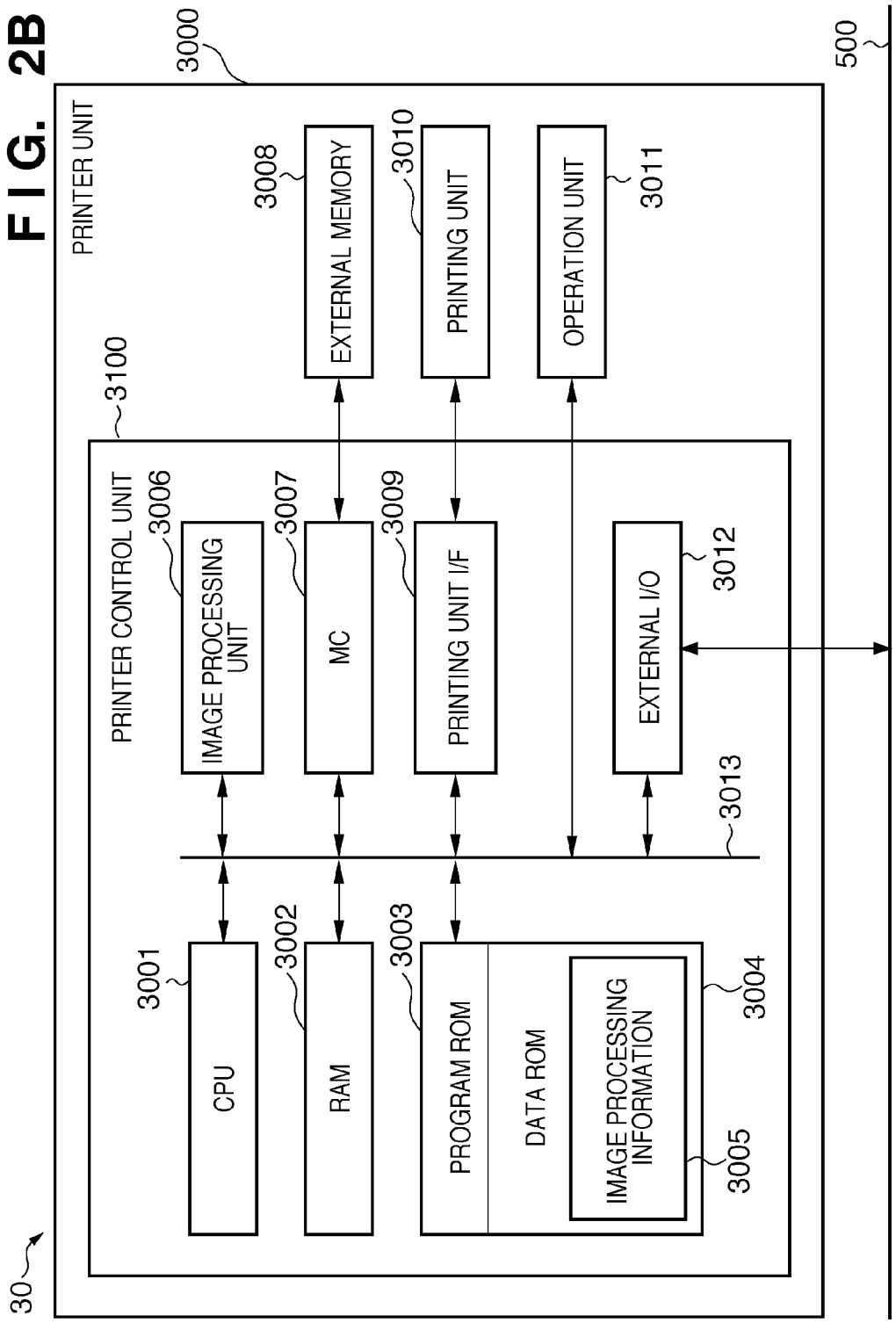
FIG. 2B is a diagram showing the structure of an SFP 30 according to the first embodiment.

FIG. 2B is a diagram showing the structure of the SFP 30 according to the first embodiment. Note that the explanation provided here will discuss parts that differ from the printer unit 2000 of the MFP 10.

Since the SFP 30 differs from the MFP 10 in that it only has a printer function, it comprises a printer unit 3000. The printer unit 3000 comprises an external memory 3008, a printing unit 3010, an operating unit (panel) 3011 and a printer control unit 3100. Further, the printer control unit 3100 comprises a CPU 3001, a RAM 3002, a program ROM 3003, a data ROM 3004, an image processing unit 3006 and a memory controller (MC hereinafter) 3007. Further, the printer control unit 3100 comprises a printing unit interface (I/F) 3009 and an external I/O 3012 which performs input/output of the network 500. These components are connected by the system BUS 3013.

As shown in FIG. 2B, the printer unit 3000, unlike the printer unit 2000, does not comprise an internal I/O. Accordingly, the SFP 30 performs printing according to the printing information supplied by an external device connected to the network 500. Further, image processing information 3005 which indicates image formats supported by the SFP 30 is stored in the data ROM 3004.

Next, with reference to FIG. 3, the image processing information 1006 stored in the data ROM 1005 will be explained. FIG. 3 is a diagram which explains the image processing information 1006 according to the first embodiment. FIG. 3 is a diagrammatic representation of the data included in the image processing information in order to simplify the explanation.

The image processing information 1006 includes data 301 which corresponds to each of the image forming apparatuses 301 and 302 indicate data of image processing information corresponding to other image forming apparatuses. Data 301 includes information regarding data formats which can be processed by the MFP 10, and is stored in the data ROM 1005 beforehand. For example, FIG. 3 shows that the image formats which can be supported by the MFP 10 are PDF, JPG and highly compressed PDF. More specifically, this can be realized by having 4 bit domains corresponding to each of the image formats in the data ROM 1005, and setting the bit corresponding to a processable image format to 1. Although this particular example shows 4 types of image formats, this is not intended to limit the type of image formats. In other words, it is desirable to arrange the domains for setting the image formats according to the capabilities of the image processing system 100.

These data 301, 302 and 303 are acquired via the network 500 when, for example the user instructs to save the scanned image data. More specifically, when an instruction to store image data in the MFP 10 is input, the CPU 1001 acquires image processing information for each of the image forming apparatuses via the network 500, and stores them in a data ROM 1005.

Next, with reference to FIG. 4A to 4C, an operation will be explained in which image data is to be saved in the image processing system 100 according to the present embodiment. Exemplary screens displayed on the display unit provided in the operating unit 1009 of the MFP 10 will be used for the explanation. Further, the device explained below comprises a touch panel, and various decisions are executed when the displayed buttons are pressed. These display screens are generated and displayed by the CPU 1001 functioning as a display control unit.

FIG. 4A is a diagram showing an operation mode input screen 400 displayed on an operation unit 1009 according to the first embodiment. The input screen 400 includes buttons 401, 402, 403, and 404 for selecting various services. When each button is pressed, the service displayed by the button is performed. If the button 404 is pressed, "scan and save" is selected and the process moves onto the screen shown in FIG. 4B.

FIG. 4B is a diagram showing a selection screen 410 for selecting an image format displayed on the operation unit 1009 according to the first embodiment. In order to convert the image data acquired by scanning the original to a desired image format, the selection screen 410 is displayed and allows selection of an image format. For this reason, the selection screen 410 displays image format conversion candidates 405 to be selected for saving the image data, and identification names of the image forming apparatuses which can support each of the image formats. Further, the CPU 1001 also can decide the priority order of the image format conversion candidates and submit it to the user.

The method of deciding priority order of image formats will be explained. First, the priority score (point) of each image format is calculated. For example, when there is only one image forming apparatus that can support a particular image format, the priority score of the image format will be 1 point. Similarly, an image format which is supported by 2 image forming apparatuses will get 2 points. To be more precise, the CPU 1001 obtains image processing information from each of the image forming apparatuses and stores in the data ROM 1005. Subsequently, the total points for each image format is derived based on the obtained image processing information. When the total points are derived, the priority order is decided in the order of decreasing total points. In the example illustrated in FIG. 4B, the PDF format is supported by the MFPs 10 and 20, and receives 2 points. Further, the JPEG format is supported by the MFPs 10, 20, and 40, and receives 3 points.

According to the present embodiment, the selection screen 410 can further display a setup screen 406 which allows setting purpose of use. The setup screen 406 includes, for example, a "high image quality" button whose purpose is to store the image data in high quality, or a "size-oriented" (or "size prioritizing") button which reduces the size of the image data.

When the user presses the "high image quality" button or the "size oriented" button, the CPU 1001 performs weighting to the priority scores of each image format, and decides the priority order once again. For example, when the user presses the "high image quality" button, the priority score of the PDF format, which leads to little deterioration in image quality, is doubled. Accordingly, in the example shown in FIG. 4B, JBIG has 2 points, JPEG and highly compressed PDF have 3 each, and PDF has 4 points. Further, as shown in FIG. 4B, the formats can be shown in the decided priority order from the top to the bottom of the selection screen. When the PDF button is selected and OK button 407 is pressed, the process moves onto the screen shown in FIG. 4C. Further, when the "size oriented" button is pressed, the CPU 1001 decides a priority order which reflects the user's purpose of use by, for example, doubling the priority score of highly compressed PDF. A weighting method of doubling the priority score is explained here, but the weighting method is not limited to doubling. In other words, the present invention can decide an appropriate multiplication factor according to the capabilities of the image processing system, the type of image format, etc.

FIG. 4C is a diagram showing a start screen 420 for starting service displayed on the operation unit 1009 according to the first embodiment. The start screen 420 confirms contents of setup with the user, and initiates service. In this example, as explained above, the process to save image data acquired from scanning of the original is selected as the service.

The start screen 420 includes a save destination list 408 for designating a save destination of the image data, a start button 409 for starting the service, as well as display of various setup contents. The user selects a save destination for the image data from the save destination list 408, and presses the start button 409 in order to start the service.

When the start button 409 is pressed, the MFP 10 scans image data from the original set on an original platform by the scanner unit 1000. Subsequently, the image processing unit 1011 converts the scanned image into the selected PDF format. Further, the CPU 1001 transmits the converted image data to the storage apparatus 50 via the network 500.

As discussed above, the present embodiment expressly presents to the user the priority order of image formats which reflects the capabilities of each image forming apparatus and the purpose of use, by displaying the image format with the highest priority score (PDF in this case) at the top of the list. However, a method displaying a message such as "recommended image format" alongside the image format can also be used.

Figure 5:
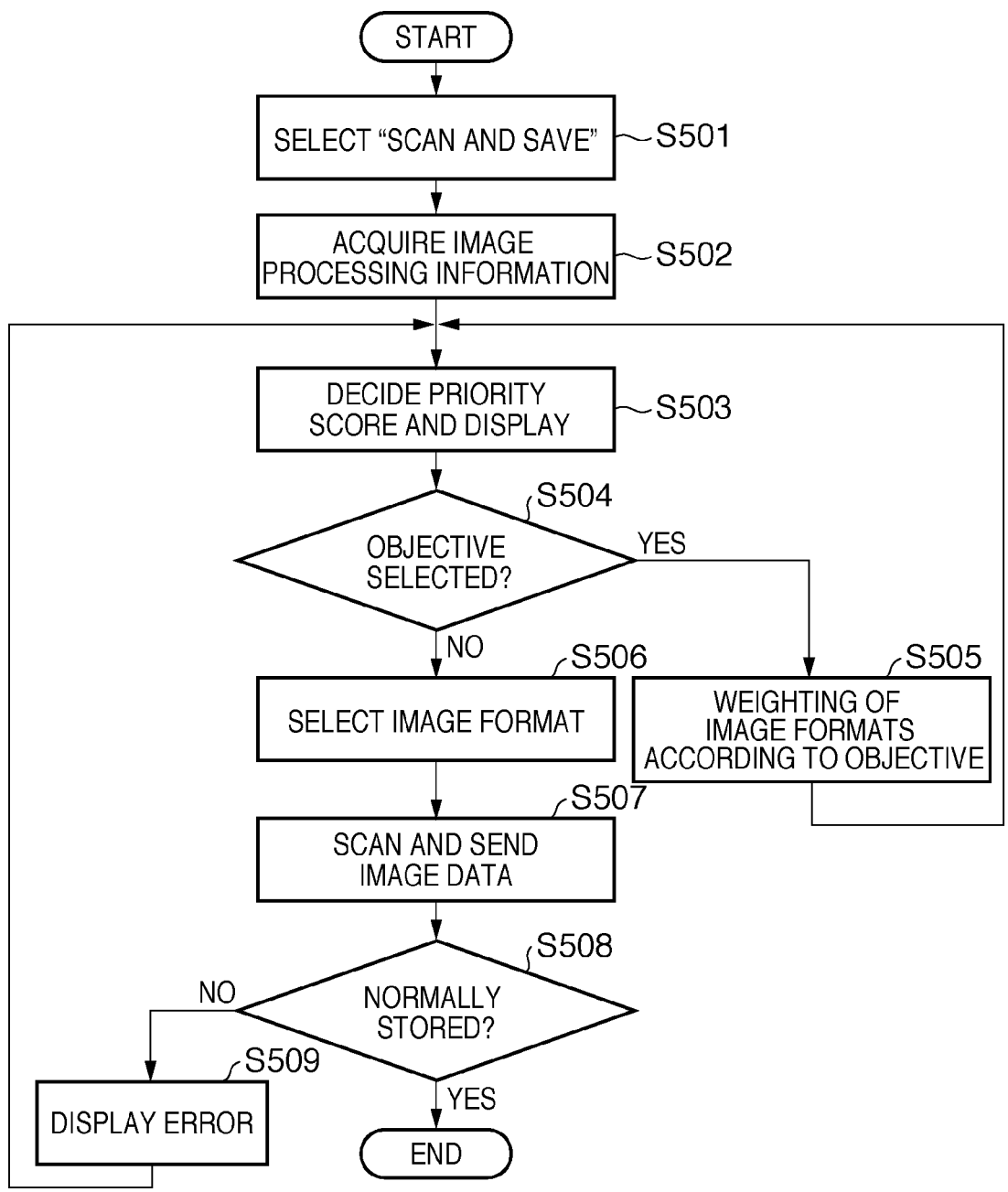
FIG. 5 is a flow chart showing the processing order when image data is to be saved according to the first embodiment.

Next, with reference to FIG. 5, a process will be explained in which the image data acquired from scanning an original is to be saved. FIG. 5 is a flow chart showing the processing order when image data is to be saved according to the first embodiment. The overall control of the process discussed below is mainly performed by the CPU 1001.

At step S501, the CPU 1001 acquires information regarding the service selected via the operation unit 1009. It will be assumed here that the "scan and save" button is selected. Subsequently, at step S502, the CPU 1001 functions as first acquiring unit and acquires image processing information from each of the image forming apparatuses via the network 500. The acquired image processing information is stored in the ROM 1005 by the CPU 1001.

Next, at step S503, the CPU 1001 functions as a deciding unit, and decides the priority score which indicates priority order of each of the image formats from the acquired image processing information. Further, the CPU 1001, after deciding the priority order, functions as a display control unit, generates the selection screen 410 for selecting an image format such as those indicated in FIG. 4B, and displays it on the display device of the operating unit 1009. At step S504, CPU 1001 monitors inputs to the operation unit 1009 in order to determine whether purpose of use has been selected. If a selection is made, the CPU 1001 at step S505 performs weighting on the priority scores decided at S503 according to the purpose (high image quality) selected by the user. Here the CPU 1001 functions as a weighting unit. Following the process of S505, the CPU 1001 switches the process to S503, and displays a selection screen with an adjusted priority order of the image formats.

Subsequently, at S506, the CPU 1001 accepts image format information selected via the selection screen 410. Here, the CPU 1001 functions as an acceptance unit. When the image format selected by the user is accepted, the CPU 1001 at step S507 initiates scanning of the original by the scanner 1008. Further, the CPU 1001 converts the image data acquired by the scan to the image format received by the image processing unit 1011. When the image data is converted into the user-selected image format, the CPU 1001 functions as a transmitting unit and transmits the converted image data to the storage apparatus 50 via the network 500. The received image data is stored in the storage apparatus 50.

At the end, at step S508, the CPU 1001 receives a reply signal from the storage apparatus 50 and determines whether the data is correctly stored. When correctly stored, the CPU 1001 finishes the process. On the other hand, when not correctly stored, the CPU 1001 displays an error message on the operating unit 1009 at step S509 and switches the process to S503.

As explained above, the image forming apparatuses provided in the present image processing system decide the priority order for each of the image formats from the image processing information, which indicates image formats supported by each of the image forming apparatuses. Further, the image forming apparatuses present an image format selection screen showing the decided priority order. In this manner, the present image processing system is able to supply information regarding an appropriate image format for image data to be stored. Accordingly, the present image processing system enables the user to conveniently select an appropriate image format without requiring troublesome operation.

Note that the present invention is not limited to the above-discussed embodiment and can be modified in various ways. For example, the image forming apparatus can decide the priority order of image formats according to the number of image forming apparatuses supporting each image format. With this, the present image processing system is able to provide a further refined recommendation of an appropriate image format to the user.

Further, the present image forming apparatus can decide the priority order by weighting the priority scores according to the purpose of use of image data. With this, the present image processing system is able to provide an image format according to the purpose of use of the image data. Therefore, the present image processing system allows the user to select an appropriate image format more conveniently.

Second Embodiment Next, with reference to FIG. 6 to 9, a second embodiment will be explained. The present embodiment is characterized in that, in addition to the image processing information, it keeps track of use history for each individual user and factors in this use history when deciding the priority order of image formats. Further, the structure of the image processing system 100 according to the present embodiment is identical to the system illustrated in FIG. 1.

Figure 6:
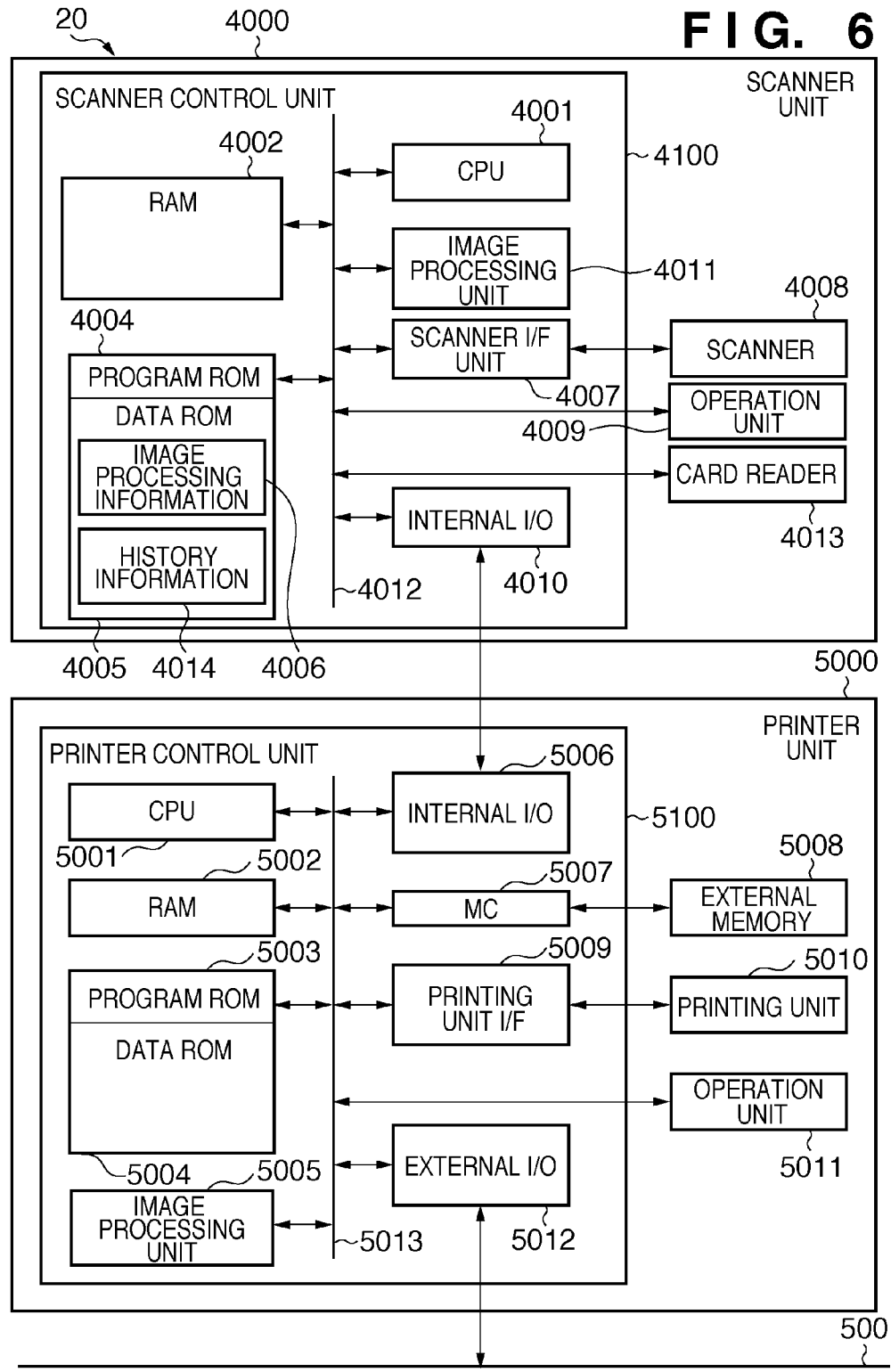
FIG. 6 is a diagram showing the structure of an MFP 20 according to a second embodiment.

FIG. 6 is a diagram showing the structure of an MFP 20 according to the second embodiment. Only the portions that differ from the structure of the MFP 10 shown in FIG. 2A will be discussed here.

The MFP 20 comprises a scanner unit 4000 and a printer unit 5000. The scanner unit 4000 comprises a scanner control unit 4100, a scanner 4008, an operating unit 4009 and a card reader 4013. As described, the present embodiment has the card reader 4013 connected to the internal BUS of the scanner unit 4000. With this, the user can notify the user ID to the scanner unit 4000 by inserting an ID card, in which the user ID is stored, into the card reader 4013.

The scanner control unit 4100 comprises a RAM 4002, a program ROM 4004, a data ROM 4005, a CPU 4001, an image processing unit 4011, a scanner unit I/F 4007 and an internal IO 4010. These components are connected by a system BUS 4012. Further, the data ROM 4005 stores history information 4014 which indicates the user's use history, in addition to image processing information 4006. The details of the history information 4014 will be discussed later with reference to FIG. 7. The data ROM 4005 functions as both the first and the second storage units in this case.

The printer unit 5000 comprises a printer control unit 5100, an external memory 5008, a printing unit 5010 and a control unit 5011. The printer control unit 5100 comprises a CPU 5001, a RAM 5002, a program ROM 5003, a data ROM 5004, an image processing unit 5005, an internal I/O 5006, an MC 5007, a printer unit I/F 5009 and and external I/O 5012. These components are connected by a system BUS 5013. Since the structure of the printer unit 5000 is identical to that of the printer unit 2000 of FIG. 2A, detailed explanations will be omitted.

FIG. 7 is a diagram explaining the history information 4014 according to the second embodiment. FIG. 7 schematically illustrates data included in the history information to simplify the explanation. The history information 4014 includes user ID 701 and a use count 703 which counts the number of times the user has used each of the image forming apparatuses 702. As shown in FIG. 7, the use count 703 is recorded for each image forming apparatus connected to the image processing system 100. Further, the history information 4014 manages data for each registered user ID.

Next, with reference to FIG. 8A to 8C, the operations for saving image data in the image processing system 100 of the present embodiment will be explained. Examples of screens displayed on the display device of the operation unit 4009 of the MFP 20 will be used for the explanation. Further, the display device explained below comprises a touch panel, and various decisions are executed when the displayed buttons are pressed. These display screens are generated and displayed by the CPU 1001 functioning as a display control unit.

FIG. 8A is a diagram showing an operation mode input screen 800 displayed on an operation unit 4009 according to the second embodiment. The input screen 800 includes buttons 801, 802, 803, and 804 for selecting various services. When each button is pressed, the service displayed by the button is performed. If the button 804 is pressed, "scan and save" is selected and the process moves onto the screen shown in FIG. 8B.

FIG. 8B is a diagram showing a selection screen 810 for selecting an image format displayed on the operation unit 4009 according to the second embodiment. The selection screen 810 displays image format conversion candidates 805 to be selected for saving the image data, and identification names of the image forming apparatuses which can support each of the image formats.

The method of deciding priority order of image formats will be explained. In the present embodiment, the priority order of image formats is decided using, in addition to the image processing information 4006, the history information 4014 stored for individual user ID. First, referring to the history information 4014 of the user ID of interest, image formats with the use numbers 703 of 0 are eliminated from consideration. In FIG. 7, the MPF 10 and the MFP 40 are eliminated. The user ID is acquired from the insertion of an ID card into the card reader 4013. Next, with reference to the image processing information 4006, the priority score of each image format is derived. The method of derivation is identical to that of the first embodiment, but does not count the image forming apparatuses which have been eliminated.

When the priority scores are derived, the image formats are displayed with the one with the highest score on the top. In FIG. 8B, JPEG, highly compressed PDF and PDF each have 1 point, and JBIG has 2 points, which puts JBIG on top. Subsequently, when JBIG button is selected and an OK button 806 is pressed, the process moves onto the screen shown in FIG. 8C.

FIG. 8C is a diagram showing a start screen 820 for starting service displayed on the operation unit 4009 according to the second embodiment. The start screen 820 includes a save destination list 807 for designating a save destination of the image data, a start button 808 for starting the service, as well as display of various setup contents. The user selects a save destination for the image data from the save destination list 807, and presses the start button 808 in order to start the service.

Figure 9:
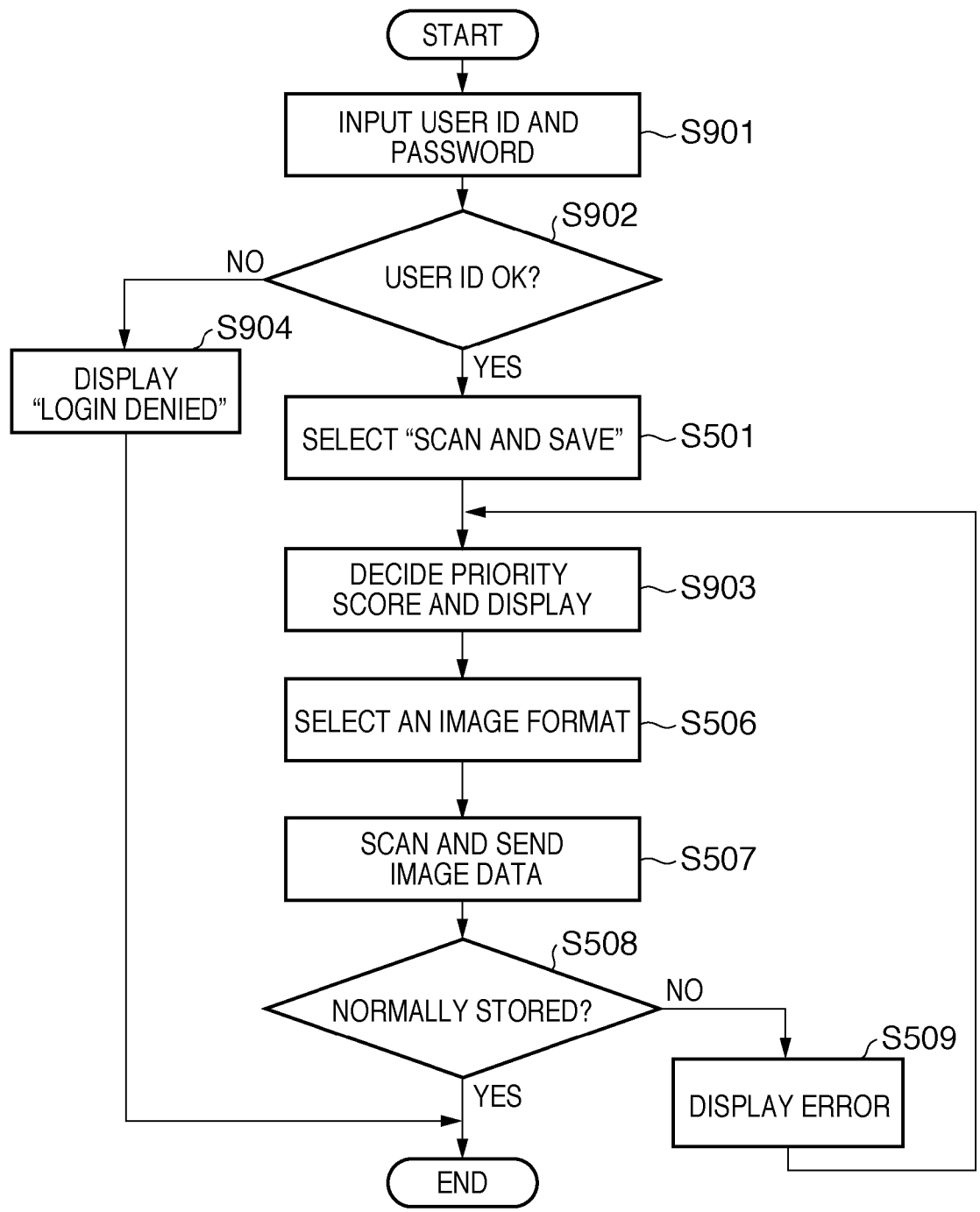
FIG. 9 is a flow chart showing the process order when image data is to be saved according to the second embodiment.

Next, with reference to FIG. 9, a process will be explained in which the image data acquired from scanning an original is to be saved. FIG. 9 is a flow chart showing the processing order when image data is to be saved according to the second embodiment. The overall control of the process discussed below is performed mainly by the CPU 4001. Processes that are identical to those in FIG. 5 are given the same reference numerals, and their explanations will be omitted. In other words, only the processes of S901 and S904 will be explained.

At step S901, the CPU 4001 acquires the user ID assigned to the user via the operation unit 4009 or the card reader 4013. At this point, the user can directly input the user ID and password via the operation unit 4009, or provide the user ID and password by inserting an ID card in which ID and password are stored into the card reader 4013.

After the user ID has been acquired, the CPU 4001 at step S902 verifies the obtained user ID with the ID authorization information managed in the scanner unit 4000 of the MFP 20, and determines whether it is a user ID registered in the image processing system 100. If the acquired ID is not a registered user ID at the image processing system 100 or if the password is incorrect, the CPU 4001 at step S904 displays login failure on the operating unit 4009. Subsequently, the process terminates.

Further, according to the present embodiment, the process of S503 shown in FIG. 5 is changed to the process of S903. Specifically, the CPU 4001 at step S903 acquires the image processing information stored in each of the image forming apparatuses, and obtains the history information 4014 stored in the data ROM 4005 corresponding to the obtained user ID. In particular, the CPI 4001 obtains the history information 4014 corresponding to the obtained user ID from the data ROM 4005 using the user ID as a search keyword. Subsequently, the CPU 4001 decides the priority score which indicates the priority order of each image format using the above mentioned image processing information and history information 4014. Further, the CPU 4001, following the decision of the priority order, generates a selection screen 810 such as the one shown in FIG. 8B for selecting an image format, and displays it on the operating unit 4009. Accordingly, the CPU 4001 at step S903 functions as a first acquiring unit, a second acquiring unit, a deciding unit and a display control unit.

As described, when deciding the image format priority order in the present embodiment, image forming apparatuses having use counts of 0 are eliminated by referring the history information 4014. However, it is also possible to halve the points of the supported image formats at the image forming apparatuses with use counts of 0 (in this case, it would be 0.5). Alternatively, it is also possible to double the points of image formats supported by image forming apparatuses having use counts of more than 50 (in this case, it would be 2.0). Further, it is possible to alter the points using the ratio of the past use counts.

Further, the history information 4014 can include information regarding time at which the user used the image forming apparatus previously. In this case, if a particular image forming apparatus was previously used within the same day, the points for supported image formats at this image forming apparatus can be doubled. Also, information regarding the image formats previously used by the user can be included in the history information 4014. In this case, the last selected image format can be displayed at the top.

As explained above, the image processing system according to the present embodiment performs weighting of priority scores based on the history information regarding the past use by the user. In this manner, the present image processing system enables selection of image formats taking into consideration the currently used image forming system. Further, it is possible for the user to easily select a more appropriate image format by eliminating the information of image forming apparatuses having no history of use by the user.

Third Embodiment Next, with reference to FIG. 10 to 12, a third embodiment will be explained. The present embodiment is characterized in that, in addition to the image processing information, it manages usage restriction information for each individual user and factors in this usage restriction information when deciding the priority order of image formats. Further, the structure of the image processing system 100 according to the present embodiment is identical to the system illustrated in FIG. 1. Note that in the present embodiment, when new devices are connected to the network 500, image processing information of the newly connected image forming apparatuses is managed by the server 60. When the MFP 40 of FIG. 1 is newly connected to the network 500, the image processing information of the MFP 40 is stored into the server 60 via the network 500. Next, the image processing information of the image forming apparatus connected to the network, managed from the server 60, is transferred to the data ROM 6005 of the MFP 40 via the network 500.

Figure 10:
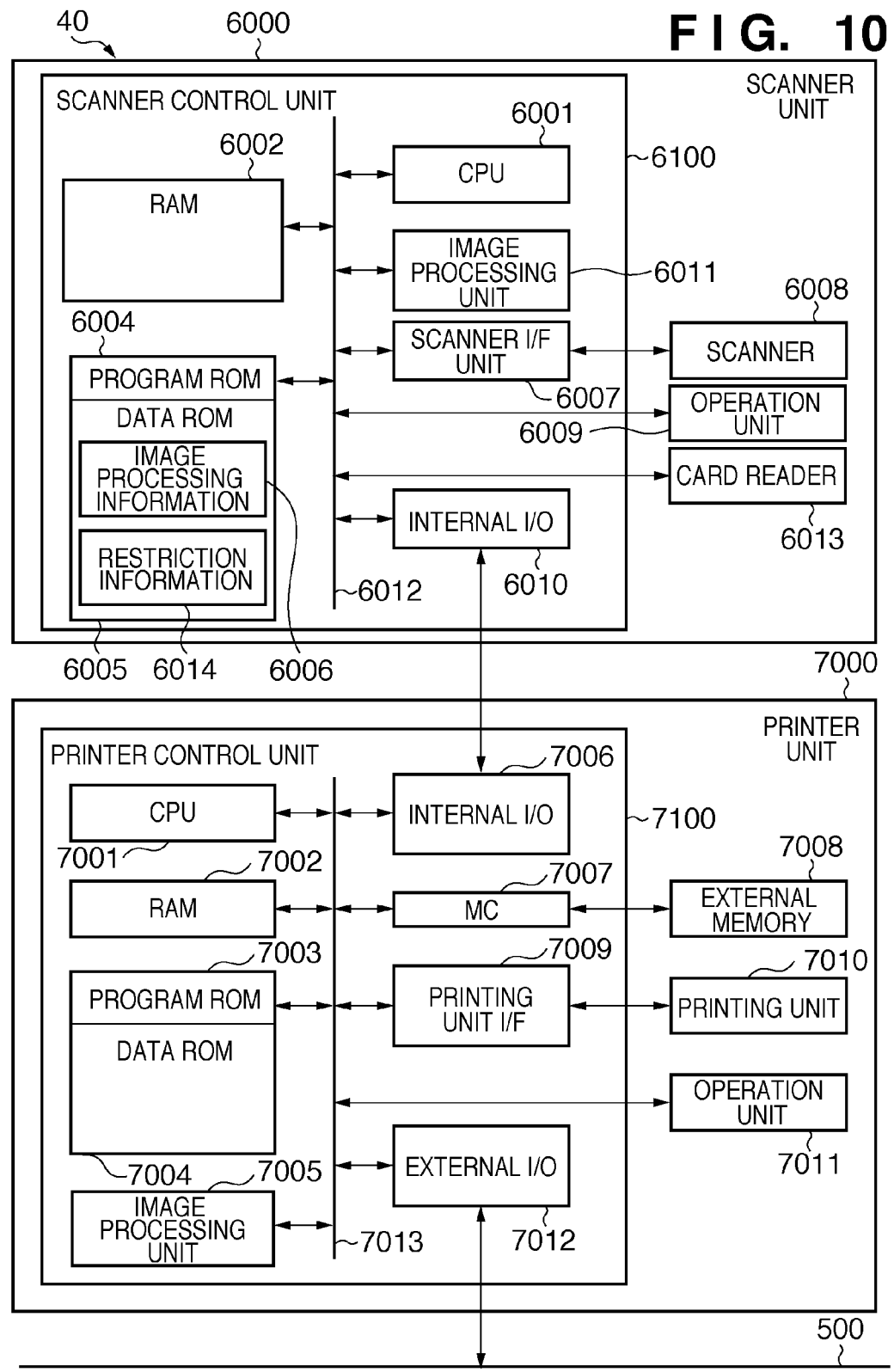
FIG. 10 is a diagram showing the structure of an MFP 40 according to a third embodiment.

FIG. 10 is a diagram showing the structure of the MFP 40 according to the third embodiment. Only the portions that differ from the structure of the MFP 10 explained with FIG. 2A will be discussed here.

The MFP 40 comprises a scanner unit 6000 and a printer unit 7000. The scanner unit 6000 comprises a scanner control unit 6100, a scanner 6008, an operating unit 6009 and a card reader 6013.

The scanner control unit 6100 comprises a RAM 6002, a program ROM 6004, a data ROM 6005, a CPU 6001, an image processing unit 6011, a scanner unit I/F 6007 and an internal IO 6010. These components are connected by a system BUS 6012. Further, the data ROM 6005 stores restriction information 6014 which indicates the user's usage restrictions, in addition to image processing information 6006. The details of the history information 6014 will be discussed later with reference to FIG. 11. The data ROM 6005 functions as both the first and the third storage units in this case.

The printer unit 7000 comprises a printer control unit 7100, an external memory 7008, a printing unit 7010 and a control unit 7011. The printer control unit 7100 comprises a CPU 7001, a RAM 7002, a program ROM 7003, a data ROM 7004, an image processing unit 7005, an internal I/O 7006, an MC 7007, a printer unit I/F 7009 and an external I/O 7012. These components are connected by a system BUS 7013. Since the structure of the printer unit 7000 is identical to that of the printer unit 2000 of FIG. 2A, detailed explanations will be omitted.

FIG. 11 is a diagram explaining the restriction information 6014 according to the third embodiment. FIG. 11 schematically shows data included in the history information to simplify the explanation. The restriction information 6014 includes a user ID 1101 and usage authorization information 1103 which indicates whether the user is authorized or restricted from using each of the image forming apparatuses 1102. As shown in FIG. 11, the usage authorization information 1103 is recorded for each image forming apparatus connected to the image processing system 100. Further, the history information 6014 manages data for each registered user ID.

Next, with reference to FIG. 12A to 12C, the operations for saving image data in the image processing system 100 of the present embodiment will be explained. Examples of screens displayed on the display device of the operation unit 6009 of the MFP 40 will be used for the explanation. Further, the display device explained below comprises a touch panel, and various decisions are executed when the displayed buttons are pressed. These display screens are generated and displayed by the CPU 1001 functioning as a display control unit.

Figure 12A:
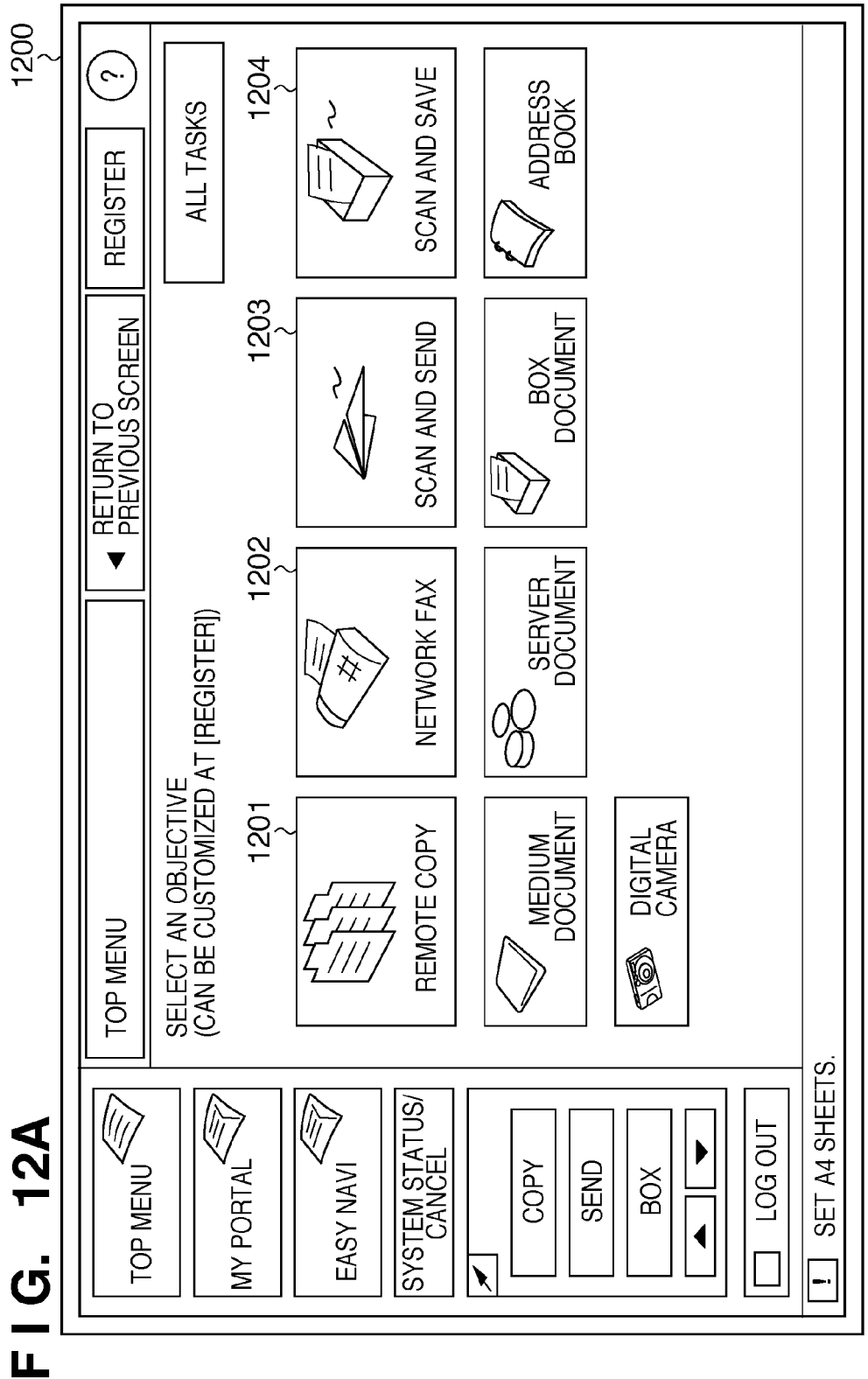
FIG. 12A is a diagram showing an input screen 1200 displayed on an operation unit 6009 according to the third embodiment.

FIG. 12A is a diagram showing an operation mode input screen 1200 displayed on an operation unit 6009 according to the third embodiment. The input screen 1200 includes buttons 1201, 1202, 1203, and 1204 for selecting various services. When each button is pressed, the service displayed by the button is performed. If the button 1204 is pressed, "scan and save" is selected and the process moves onto the screen shown in FIG. 12B.

FIG. 12B is a diagram showing a selection screen 1210 for selecting an image format displayed on the operation unit 6009 according to the third embodiment. The selection screen 1210 displays image format conversion candidates 1205 to be selected for saving the image data, and identification names of the image forming apparatuses which can support each of the image formats.

The method of deciding priority order of image formats will be explained. In the present embodiment, the priority order of image formats is decided using, in addition to the image processing information 6006, the restriction information 6014 stored for individual user ID. First, referring to the restriction information 6014 of the user ID of interest, image forming apparatuses for which the usage authorization information 1103 of 0 are eliminated from consideration. The usage authorization information 1103 indicates that the user is restricted from using the device with 0, and indicates the user is authorized to use the device with 1. In FIG. 11, the MPF 10 and the MFP 30 are eliminated. The user ID is acquired from the insertion of an ID card into the card reader 6013. Next, by referring to the image processing information 6006, the priority score of each image format is derived. The method of derivation is identical to that of the first embodiment, but does not count the image forming apparatuses which have been eliminated.

When the priority scores are derived, the image formats are displayed with the one with the highest score on the top. In FIG. 12B, JBIG and PDF each have 1 point, and JPEG and highly compressed PDF each have 2 points, which puts JPEG and highly compressed PDF on the top. Subsequently, when JPEG button is selected and an OK button 1206 is pressed, the process moves onto the screen shown in FIG. 12C.

FIG. 12C is a diagram showing a start screen 1220 for starting service displayed on the operation unit 6009 according to the third embodiment. The start screen 1220 includes a save destination list 1207 for designating a save destination of the image data, a start button 1208 for starting the service, as well as display of various setup contents. The user selects a save destination for the image data from the save destination list 1207, and presses the start button 1208 in order to start the service.

Regarding the process in which the image data acquired from scanning an original is to be saved, is identical to the process shown in FIG. 9 of the second embodiment, and will be omitted. However, at step S903, priority order of image formats will be decided taking the image processing information 6006 and the restriction information 6014 into consideration. Further, at step S903, the CPU 6001 functions as the first acquiring unit, the third acquiring unit, the deciding unit and the display control unit.

As explained above, the image processing system according to the present embodiment performs weighting of priority scores based on the restriction information regarding use restriction of individual users for each of the image forming apparatuses. In this manner, the present image processing system enables selection of image formats taking into consideration the image forming apparatuses that can be used. Further, it is possible for the user to easily select a more appropriate image format by eliminating information regarding image forming apparatuses having no record of use by the user.

Other Embodiments

In embodiments 1 to 3, each image forming apparatus stores only their own image processing information, and obtained image processing information of other image forming apparatuses only when deciding the priority order of image formats. However, according to other embodiments, it is also possible to store, in the memory domain of each image forming apparatus, the image processing information of other image forming apparatuses connected to the image processing system 100 in addition to the image processing information of its own. In such a case, the CPU in each image forming apparatus needs to update the image processing apparatus 100 with the image processing information stored in the memory domain of each image forming apparatus when a new image forming apparatus is added or a connected image forming apparatus is withdrawn. At this point, the CPU of each image processing device functions as an updating unit. Further, the overall control of these updating processes can be performed by the server 60. According to this, when the service storing the image data into storage apparatus 50 is provided, the present image processing system 100 will be able to omit the process of obtaining image processing information of other image forming apparatuses, improving the throughput. Further, the update process can be carried out periodically at every designated time point.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-233375 filed on Sep. 7, 2007, which is hereby incorporated by reference herein in its entirety.

What is claimed is:

1. An image processing system connected with a plurality of image forming apparatuses and a storage apparatus storing image data via a network, wherein each of the plurality of image forming apparatuses comprises:
a first storage unit adapted to store image processing information that indicates image format of image data which is supported by the image forming apparatus;
a first acquiring unit adapted to acquire image processing information from other image forming apparatuses via the network when storing image data in the storage apparatus, wherein the image data to be stored in the storage apparatus is shared by the plurality of image forming apparatuses;
a deciding unit adapted to decide priority order of each of image formats for displaying on a selection screen in accordance with the image processing information acquired from the plurality of image forming apparatuses by the first acquiring unit, the priority order being based on the number of image forming apparatuses supporting each of the image formats;
a display control unit adapted to display image formats in the selection screen, based on the decided priority order of the image format;
an acceptance unit adapted to accept image format selection via the selection screen,
an input unit adapted to input image data;
a conversion unit adapted to convert the input image data into the selected image format; and
a transmission unit adapted to transmit the converted image data via the network to the storage apparatus in order to store the converted image data in the storage apparatus.

2. The image processing system according to claim 1 wherein:
the display control unit generates and displays, along with the selection screen, a setting screen which allows setting of a use objective of image data;
the deciding unit comprises a weighting unit which performs, when the use objective of image data is set via the setting screen, weighting of the priority in accordance with the set use objective; and
the display control unit displays a selection screen with an adjusted priority order for each of the image formats, adjusted in accordance with the weighted priority.

3. The image processing system according to claim 2 wherein information indicating the use objective includes information that indicates either reduction of image size data or increasing image quality as an objective.

4. The image processing system according to claim 1 further comprising:
a second storage unit adapted to store history information including at least one of usage count and time of use of each image forming apparatus for each user ID assigned to the users; and
a second acquiring unit adapted to acquire history information of each user ID from the second storage unit using, as a search key word, the user ID inputted into the input apparatus provided in the image forming apparatus;
and wherein the deciding unit decides the priority indicating priority order of each image format based on the acquired image processing information and history information.

5. The image processing system according to claim 1 further comprising:
a third storage unit adapted to store restriction information including whether each image forming apparatus can be used or not by each user ID assigned to the users; and
a third acquiring unit adapted to acquire restriction information of each user ID from the third storage unit using, as a search key word, the user ID inputted into the input apparatus provided in the image forming apparatus;
and wherein the deciding unit decides the priority indicating priority order of each image format based on the acquired image processing information and restriction information.

6. The image processing system according to claim 1 wherein:
the first storage unit stores image processing information of other image forming apparatuses connected to the image processing system, in addition to the image processing information of its own image forming apparatus; and
the image forming apparatus comprises an updating unit adapted to update the image processing system with the image processing information stored in the first storage unit, when additional image forming apparatuses are added or a connected image forming apparatus is withdrawn.

7. The image processing system according to claim 1 wherein the display control unit is adapted to display the selection screen indicating image forming apparatuses which support each of the image formats.

8. The image processing system according to claim 1 further comprising a scanning unit which scans images of originals and outputs image data, and wherein the input unit inputs the outputted image data.

9. A control method for an image processing system connected with a plurality of image forming apparatuses and a storage apparatus storing image data via a network, comprising steps of:
storing image processing information that indicates image format of image data which is supported by the image forming apparatus;
acquiring image processing information from other image forming apparatuses via the network when storing image data in the storage apparatus, wherein the image data to be stored in the storage apparatus is shared by the plurality of image forming apparatuses;
deciding priority order of each of image formats for displaying on a selection screen in accordance with the image processing information acquired from the plurality of image forming apparatuses by the first acquiring unit, the priority order being based on the number of image forming apparatuses supporting each of the image formats display image formats in the selection screen, based on the decided priority order of the image format;
accepting image format selection via the selection screen;
inputting image data;
converting the input image data into the selected image format; and
transmitting the converted image data via the network to the storage apparatus in order to store the converted image data in the storage apparatus.

10. An image forming apparatus being capable of connecting to a plurality of image forming apparatus and a storage apparatus, the image forming apparatus comprising:
a first storage unit adapted to store image processing information that indicates image format of image data which is supported by the image forming apparatus;
a first acquiring unit adapted to acquire image processing information from other image forming apparatuses via the network when storing image data in the storage apparatus, wherein the image data to be stored in the storage apparatus is shared by the plurality of image forming apparatuses;
a deciding unit adapted to decide priority order of each of image formats for displaying on a selection screen in accordance with the image processing information acquired from the plurality of image forming apparatuses by the first acquiring unit, the priority order being based on the number of image forming apparatuses supporting each of the image formats;
a display control unit adapted to display image formats in the selection screen, based on the decided priority order of the image format;
an acceptance unit adapted to accept image format selection via the selection screen;
an input unit adapted to input image data;
a conversion unit adapted to convert the input image data into the selected image format; and
a transmission unit adapted to transmit the converted image data via the network to the storage apparatus in order to store the converted image data in the storage apparatus.

* * * * *